US012768179B2

(12) United States Patent
Perry et al.

(10) Patent No.: US 12,768,179 B2
(45) Date of Patent: Oct. 20, 2026

(54) GANTRY-BASED ADDITIVE MANUFACTURING SYSTEM

(71) Applicants: George Perry, Lebanon, NJ (US); Daniel Castoro, Lincroft, NJ (US); Devin Patten, Red Bank, NJ (US); Christian Merkle, Township of Washington, NJ (US); Ku Supp Jung, Gimpo-Si (KR); Sung Woo Lee, Incheon (KR); Seong Hwa Jeong, Incheon (KR)

(72) Inventors: George Perry, Lebanon, NJ (US); Daniel Castoro, Lincroft, NJ (US); Devin Patten, Red Bank, NJ (US); Christian Merkle, Township of Washington, NJ (US); Ku Supp Jung, Gimpo-Si (KR); Sung Woo Lee, Incheon (KR); Seong Hwa Jeong, Incheon (KR)

(73) Assignee: STRUXURE CORPORATION, Hoboken, NJ (US)

( * ) Notice: Subject to any disclaimer, the term of this patent is extended or adjusted under 35 U.S.C. 154(b) by 0 days.

(21) Appl. No.: 19/302,150

(22) Filed: Aug. 18, 2025

(65) Prior Publication Data

US 2025/0369241 A1 Dec. 4, 2025

(51) Int. Cl.
*E04G 21/00* (2006.01)
*E04G 21/04* (2006.01)
(Continued)

(52) U.S. Cl.
CPC ..... *E04G 21/0463* (2013.01); *E04G 21/0427* (2013.01); *B33Y 30/00* (2014.12); *B33Y 50/02* (2014.12)

(58) Field of Classification Search
None
See application file for complete search history.

(56) References Cited

U.S. PATENT DOCUMENTS 5,848,458 A * 12/1998 Bullen .................. B23P 21/004 29/33 K
9,174,388 B2 11/2015 Batchelder et al.
(Continued)

FOREIGN PATENT DOCUMENTS

CN 105563834 A 5/2016
CN 105569344 A 5/2016
(Continued)

OTHER PUBLICATIONS

Https://www.rt.com/usa/3d-printed-concrete-house-727/.
(Continued)

*Primary Examiner* — Jonathan M Dager
(74) *Attorney, Agent, or Firm* — Joseph Farco

(57) ABSTRACT

An additive manufacturing system includes a gantry architecture with three orthogonally oriented beams along the X-, Y-, and Z-axes. The first beam (X-axis) and second beam (Z-axis) are configured to translate with respect to each other, while the second beam and third beam (Y-axis) are further configured to both translate and rotate relative to one another. A computer-controlled printing system is mounted to the first beam and includes at least one nozzle capable of depositing construction material suitable for building habitation structures. This configuration supports large-scale, spatially dynamic and artificially intelligent 3D printing.

20 Claims, 19 Drawing Sheets

(51) Int. Cl.
*B33Y 30/00* (2015.01)
*B33Y 50/02* (2015.01)

(56) References Cited

U.S. PATENT DOCUMENTS 9,815,241 B2 11/2017 Pforte et al.
9,993,973 B1 * 6/2018 Barnhart ................. B29C 64/10
10,059,058 B2 * 8/2018 Hartmann ............... B22F 3/003
10,074,449 B2 9/2018 White et al.
10,272,613 B2 4/2019 Boyd, IV
10,322,574 B2 * 6/2019 Ng .......................... B22F 12/52
10,717,263 B2 * 7/2020 Knecht ................. B29C 64/223
10,753,110 B2 8/2020 Ma
10,814,369 B2 10/2020 Hooper et al.
11,020,899 B2 6/2021 Santiago, Jr. et al.
11,090,871 B2 8/2021 Hanano
11,124,961 B2 9/2021 Crump et al.
11,179,927 B2 11/2021 Ford et al.
11,261,597 B2 3/2022 Joze
11,408,166 B2 8/2022 Le Roux
11,413,684 B2 8/2022 Gibson et al.
11,413,688 B2 8/2022 Song et al.
11,485,044 B2 11/2022 Le Roux
11,613,904 B2 * 3/2023 Turnquist ................ B28B 1/001
264/308
11,697,222 B2 7/2023 Li et al.
11,724,314 B2 8/2023 Ng et al.
11,731,344 B2 8/2023 Fukumoto et al.
11,731,351 B2 8/2023 Ballard et al.
11,761,195 B2 * 9/2023 Le Roux ................. B28B 1/001
425/62
11,919,193 B2 3/2024 Kenny et al.
11,926,099 B2 * 3/2024 Stulc ..................... B29C 64/118
11,939,762 B2 3/2024 Turnquist et al.
11,939,763 B2 3/2024 Lorenzo Pellico
11,958,236 B2 4/2024 Levy
11,970,868 B2 4/2024 Cooper et al.
11,970,875 B2 4/2024 Turnquist et al.
11,975,484 B2 5/2024 Boyd, IV et al.
12,000,162 B2 6/2024 Boros et al.
12,024,907 B2 * 7/2024 Charmley ............... B28B 1/001
12,042,988 B2 7/2024 Bromberg et al.
12,076,918 B2 9/2024 Bromberg et al.
12,083,742 B2 9/2024 Townsend et al.
12,083,743 B2 9/2024 Susnjara et al.
12,097,709 B2 9/2024 Alberts et al.
12,134,225 B2 11/2024 Hikmet
12,151,439 B2 11/2024 Kuiper et al.
12,158,015 B2 12/2024 González Böhme et al.
12,208,583 B2 1/2025 Andrews et al.
12,257,642 B2 3/2025 Ashmore et al.
12,286,803 B2 4/2025 Boros et al.
12,286,804 B2 4/2025 Pettit
12,318,993 B2 6/2025 Rumbak et al.
12,319,001 B2 6/2025 Tobin et al.
12,358,227 B2 7/2025 Andrews et al.
12,377,575 B2 * 8/2025 Reusch ............... E04G 21/0436
12,390,955 B2 8/2025 Reusch
12,410,039 B2 * 9/2025 Wang ......................... B66C 9/10
2005/0280185 A1 * 12/2005 Russell ................. B29C 64/165
425/375
2015/0094837 A1 * 4/2015 Cohen ................... B29C 64/147
700/98
2016/0023403 A1 * 1/2016 Ramos ................... B33Y 10/00
425/171
2016/0039194 A1 2/2016 Cable
2016/0075091 A1 3/2016 Cable
2017/0021527 A1 * 1/2017 Grivetti ............... E04G 21/0436
2017/0283297 A1 10/2017 Kulmagambetov
2018/0043630 A1 2/2018 Hoover et al.
2018/0071949 A1 * 3/2018 Giles ....................... B28B 1/001
2018/0141273 A1 * 5/2018 Santiago, Jr. ........... B29C 64/20
2018/0162011 A1 * 6/2018 Friend ..................... E02F 9/205
2018/0169953 A1 * 6/2018 Matusik ................ B29C 64/124
2018/0339451 A1 11/2018 Moon et al.
2018/0345533 A1 * 12/2018 Hernandez ............ E04B 1/3505
2018/0361729 A1 * 12/2018 Gibson .................. G01B 11/24
2019/0211684 A1 7/2019 Burbaum
2019/0255611 A1 8/2019 Frank et al.
2019/0316344 A1 10/2019 Pagani et al.
2019/0351620 A1 * 11/2019 Jaiswal ................... B22F 10/20
2020/0048893 A1 * 2/2020 Martinez ............... E04B 1/3505
2020/0368970 A1 * 11/2020 Georgeson ............. B33Y 10/00
2021/0094102 A1 * 4/2021 Lin ........................ B33Y 40/20
2021/0107177 A1 * 4/2021 Giles .......................... E04B 1/35
2022/0032500 A1 * 2/2022 Bramberger ............ B66C 13/48
2022/0154443 A1 * 5/2022 Jensen .................... B28B 1/001
2022/0234295 A1 7/2022 Griffith et al.
2022/0268039 A1 8/2022 Ford et al.
2022/0349192 A1 11/2022 Joo
2022/0355508 A1 11/2022 Le Roux et al.
2023/0134177 A1 * 5/2023 Reusch ................... B28B 1/001
425/143
2023/0264384 A1 8/2023 Gerbers et al.
2023/0286055 A1 * 9/2023 Ballard ................... B22F 10/25
2023/0330891 A1 10/2023 Mo et al.
2023/0347581 A1 * 11/2023 Ford ...................... B33Y 10/00
2023/0356471 A1 * 11/2023 Nikshi ................... B33Y 50/02
2023/0366222 A1 * 11/2023 Pettit ................... E04G 21/0427
2023/0391004 A1 * 12/2023 Ma ......................... B33Y 30/00
2024/0017340 A1 1/2024 Konrath et al.
2024/0083105 A1 * 3/2024 Luick ...................... B22F 10/28
2024/0093518 A1 3/2024 Wang et al.
2024/0100588 A1 3/2024 Rothaug et al.
2024/0165850 A1 * 5/2024 Reusch ................... B28B 1/001
2024/0196950 A1 6/2024 Le-Bail et al.
2024/0218665 A1 7/2024 Kutchko et al.
2024/0229481 A9 7/2024 Khoshnevis
2024/0262004 A1 8/2024 Ferreira
2024/0286347 A1 8/2024 Periyasamy et al.
2024/0286351 A1 8/2024 Maucher et al.
2024/0295131 A1 9/2024 De Bonet et al.
2024/0300171 A1 * 9/2024 Reusch ................. B29C 64/209
2024/0301704 A1 9/2024 Konshin et al.
2024/0328144 A1 10/2024 Kamp
2024/0328178 A1 10/2024 Kamp
2024/0360668 A1 10/2024 Niroumand et al.
2024/0376708 A1 11/2024 Belorustsev et al.
2024/0408820 A1 12/2024 Ma
2024/0424733 A1 12/2024 Ferreira
2024/0426129 A1 12/2024 Kenny et al.
2025/0018598 A1 * 1/2025 Schlette .................. B28B 1/001
2025/0100182 A1 * 3/2025 Holm ......................... B28B 3/24
2025/0188755 A1 * 6/2025 Sprecher ............. E04G 21/0463

FOREIGN PATENT DOCUMENTS

CN 105599303 A 5/2016
CN 105604327 A 5/2016
CN 105604328 A 5/2016
CN 105604329 A 5/2016
CN 205467387 U 8/2016
CN 205467388 U 8/2016
CN 205467389 U 8/2016
CN 205467390 U 8/2016
CN 205467400 U 8/2016
CN 205476496 U 8/2016
CN 205476499 U 8/2016
CN 205476508 U 8/2016
CN 205476509 U 8/2016
CN 205476510 U 8/2016
CN 205558296 U 9/2016
CN 205558297 U 9/2016
CN 104891891 B 4/2017
CN 106996108 A 8/2017
CN 107034890 A 8/2017
CN 105563835 B 10/2017
CN 107285609 A 10/2017
CN 207044341 U 2/2018
CN 105569343 B 3/2018
CN 207059225 U 3/2018
CN 108005389 A 5/2018
CN 207582973 U 7/2018
CN 108437156 A 8/2018

(56) References Cited

FOREIGN PATENT DOCUMENTS

| | | | |
|---|---|---|---|
| CN | 108437157 | A | 8/2018 |
| CN | 108442709 | A | 8/2018 |
| CN | 207808002 | U | 9/2018 |
| CN | 105604322 | B | 12/2018 |
| CN | 208197086 | U | 12/2018 |
| CN | 208215593 | U | 12/2018 |
| CN | 208235965 | U | 12/2018 |
| CN | 208280621 | U | 12/2018 |
| CN | 208280622 | U | 12/2018 |
| CN | 105599304 | B | 1/2019 |
| CN | 109610839 | A | 4/2019 |
| CN | 107097324 | B | 5/2019 |
| CN | 108103952 | B | 5/2019 |
| CN | 107419901 | B | 6/2019 |
| CN | 107974950 | B | 6/2019 |
| CN | 109834804 | A | 6/2019 |
| CN | 209040563 | U | 6/2019 |
| CN | 209040565 | U | 6/2019 |
| CN | 107553687 | B | 7/2019 |
| CN | 107829559 | B | 7/2019 |
| CN | 209457403 | U | 10/2019 |
| CN | 106320713 | B | 12/2019 |
| CN | 110733096 | A | 1/2020 |
| CN | 109760174 | B | 7/2020 |
| CN | 211137533 | U | 7/2020 |
| CN | 111485689 | A | 8/2020 |
| CN | 111827682 | A | 10/2020 |
| CN | 211974214 | U | 11/2020 |
| CN | 109079955 | B | 1/2021 |
| CN | 109025256 | B | 2/2021 |
| CN | 212984520 | U | 4/2021 |
| CN | 112761358 | A | 5/2021 |
| CN | 112832522 | A | 5/2021 |
| CN | 112942838 | A | 6/2021 |
| CN | 213979846 | U | 8/2021 |
| CN | 113370345 | A | 9/2021 |
| CN | 214365017 | U | 10/2021 |
| CN | 214575751 | U | 11/2021 |
| CN | 214658876 | U | 11/2021 |
| CN | 215094316 | U | 12/2021 |
| CN | 111975927 | B | 2/2022 |
| CN | 114059657 | A | 2/2022 |
| CN | 113059806 | B | 3/2022 |
| CN | 113320165 | B | 4/2022 |
| CN | 216230781 | U | 4/2022 |
| CN | 114536761 | A | 5/2022 |
| CN | 114939987 | A | 8/2022 |
| CN | 115012665 | A | 9/2022 |
| CN | 217480398 | U | 9/2022 |
| CN | 113605704 | B | 11/2022 |
| CN | 115318517 | A | 11/2022 |
| CN | 115816598 | A | 3/2023 |
| CN | 114439234 | B | 4/2023 |
| CN | 116214667 | A | 6/2023 |
| CN | 116604674 | A | 8/2023 |
| CN | 116641555 | A | 8/2023 |
| CN | 115217272 | B | 9/2023 |
| CN | 116852488 | A | 10/2023 |
| CN | 219794681 | U | 10/2023 |
| CN | 117021284 | A | 11/2023 |
| CN | 219973933 | U | 11/2023 |
| CN | 219988482 | U | 11/2023 |
| CN | 117282567 | A | 12/2023 |
| CN | 117418681 | A | 1/2024 |
| CN | 114535618 | B | 3/2024 |
| CN | 117722015 | A | 3/2024 |
| CN | 107571371 | B | 4/2024 |
| CN | 110919002 | B | 4/2024 |
| CN | 116945323 | B | 4/2024 |
| CN | 117846349 | A | 4/2024 |
| CN | 118024379 | A | 5/2024 |
| CN | 118087871 | A | 5/2024 |
| CN | 118087872 | A | 5/2024 |
| CN | 113560607 | B | 6/2024 |
| CN | 118461904 | A | 8/2024 |
| CN | 221561714 | U | 8/2024 |
| CN | 109594782 | B | 10/2024 |
| CN | 118727652 | A | 10/2024 |
| CN | 108442708 | B | 11/2024 |
| CN | 108571170 | B | 11/2024 |
| CN | 118997167 | A | 11/2024 |
| CN | 119041434 | A | 11/2024 |
| CN | 119145305 | A | 12/2024 |
| CN | 222200981 | U | 12/2024 |
| CN | 119244004 | A | 1/2025 |
| CZ | 35667 | U1 | 12/2021 |
| CZ | 35871 | U1 | 3/2022 |
| EP | 3337624 | A4 | 10/2019 |
| EP | 3505328 | B1 | 3/2022 |
| EP | 3934872 | A4 | 10/2022 |
| EP | 3680422 | B1 | 12/2022 |
| EP | 3833833 | B1 | 4/2023 |
| EP | 4185756 | A1 | 5/2023 |
| EP | 4229255 | A1 | 8/2023 |
| EP | 4299267 | A1 | 1/2024 |
| EP | 3898145 | | 7/2024 |
| EP | 3898144 | B1 | 8/2024 |
| EP | 4411073 | A1 | 8/2024 |
| EP | 4427895 | A1 | 9/2024 |
| EP | 3934873 | B1 | 11/2024 |
| EP | 4466127 | A1 | 11/2024 |
| ES | 2957717 | A1 | 1/2024 |
| GB | 2518807 | A | 4/2015 |
| IN | 201721044524 | A | 12/2017 |
| IN | 201821046226 | A | 6/2020 |
| IN | 202041035668 | A | 2/2022 |
| IN | 202341033354 | A | 6/2023 |
| IN | 451158 | B | 9/2023 |
| IN | 202441051965 | A | 7/2024 |
| IN | 202421069581 | A | 10/2024 |
| JP | 2022184275 | A | 12/2022 |
| JP | 7225327 | B2 | 2/2023 |
| JP | 7264398 | B2 | 4/2023 |
| JP | 2024053973 | A | 4/2024 |
| JP | 2024087973 | A | 7/2024 |
| JP | 7593696 | B1 | 12/2024 |
| KR | 10-1895151 | B1 | 9/2018 |
| KR | 10-1914524 | B1 | 11/2018 |
| KR | 10-1911404 | B1 | 12/2018 |
| KR | 10-1934478 | B1 | 1/2019 |
| KR | 10-2100783 | B1 | 4/2020 |
| KR | 10-2102730 | B1 | 4/2020 |
| KR | 10-2105830 | B1 | 4/2020 |
| KR | 10-2107988 | B1 | 5/2020 |
| KR | 10-2160056 | B1 | 9/2020 |
| KR | 10-2194848 | B1 | 12/2020 |
| KR | 10-2227820 | B1 | 3/2021 |
| KR | 10-2333574 | B1 | 12/2021 |
| KR | 10-2374395 | B1 | 3/2022 |
| KR | 10-2022-0123496 | A | 9/2022 |
| KR | 10-2023-0020598 | A | 2/2023 |
| KR | 10-2544512 | B1 | 6/2023 |
| KR | 10-2023-0157632 | A | 11/2023 |
| KR | 10-2024-0022752 | A | 2/2024 |
| KR | 10-2024-0022753 | A | 2/2024 |
| KR | 10-2024-0027983 | A | 3/2024 |
| KR | 10-2024-0039272 | A | 3/2024 |
| KR | 10-2024-0039273 | A | 3/2024 |
| KR | 10-2024-0039274 | A | 3/2024 |
| KR | 10-2643336 | B1 | 3/2024 |
| KR | 10-2649695 | B1 | 4/2024 |
| KR | 10-2024-0056871 | A | 5/2024 |
| KR | 10-2024-0065453 | A | 5/2024 |
| KR | 10-2024-0085640 | A | 6/2024 |
| KR | 10-2024-0128226 | A | 8/2024 |
| KR | 10-2024-0134801 | A | 9/2024 |
| KR | 10-2701227 | B1 | 9/2024 |
| KR | 10-2707487 | B1 | 9/2024 |
| KR | 10-2024-0162671 | A | 11/2024 |
| KR | 10-2024-0039271 | A | 2/2025 |
| RU | 2828327 | C2 | 10/2024 |
| WO | 2017/008637 | A1 | 1/2017 |
| WO | 2017/121912 | A1 | 7/2017 |
| WO | 2017/153790 | A1 | 9/2017 |

(56) References Cited

FOREIGN PATENT DOCUMENTS

| | | | |
|---|---|---|---|
| WO | 2017/172574 | A1 | 10/2017 |
| WO | 2018/167364 | A1 | 9/2018 |
| WO | 2018/230855 | A1 | 12/2018 |
| WO | 2019/225885 | A1 | 11/2019 |
| WO | 2020/141371 | A1 | 7/2020 |
| WO | 2020/152542 | A1 | 7/2020 |
| WO | 2020/204966 | A1 | 10/2020 |
| WO | 2021/016605 | A1 | 1/2021 |
| WO | 2021/233905 | A1 | 11/2021 |
| WO | 2022/124943 | A1 | 6/2022 |
| WO | 2023/240108 | A1 | 12/2023 |
| WO | 2023/247325 | A1 | 12/2023 |
| WO | 2023/250203 | A3 | 2/2024 |
| WO | 2024/064272 | A3 | 5/2024 |
| WO | 2024/162846 | A1 | 8/2024 |
| WO | 2024/185695 | A1 | 9/2024 |
| WO | 2024/197260 | A1 | 9/2024 |

OTHER PUBLICATIONS

Https://www.sciencedirect.com/science/article/abs/pii/S0264127516303811.

Https://www.sciencedirect.com/science/article/abs/pii/S0926580517307847.

Https://www.tandfonline.com/doi/pdf/10.1080/17452759.2016.1209867.

Https://espace.curtin.edu.au/bitstream/handle/20.500.11937/7988/240556_240556.pdf?sequence=2&isAllowed=y.

Https://www.sciencedirect.com/science/article/pii/S0926580520302466.

Https://iopscience.iop.org/article/10.1088/1757-899X/814/1/012022/meta.

Https://www.researchgate.net/profile/Salvatore-Salamone-2/publication/320294238_Applications_of_Additive_Manufacturing_in_the_Construction_Industry_A_Prospective_Review/links/5a7b15de458515229b1bfff6/Applications-of-Additive-Manufacturing-in-the-Construction-Industry-A-Prospective-Review.pdf?_cf_chl_tk=Xfud6OseAC9sGuiGEmQMa7Xa4ZQf18NSDQaH6ZLEiGM-1737617071-1.0.1.1-.

Https://www.mdpi.com/1996-1073/14/15/4474.

Https://www.sciencedirect.com/science/article/pii/S2214860419309029.

Https://makezine.com/article/digital-fabrication/3d-printing-workshop/castle-3d-printed-with-concrete-in-someones-yard/.

Https://www.sciencedirect.com/science/article/abs/pii/S1359836817342944.

Https://inhabitat.com/chinese-company-assembles-ten-3d-printed-concrete-houses-in-one-day-for-less-than-5000-each/.

Https://timesofindia.indiatimes.com/science/a-chinese-company-3d-printed-10-houses-in-a-day/articleshow/33777127.cms.

Https://www.sciencedirect.com/science/article/abs/pii/S2214785321032995.

Https://pubs.acs.org/doi/10.1021/acsengineeringau.4c00001.

Https://www.sciencedirect.com/science/article/abs/pii/S0958946505001034?via%3Dihub.

Https://digitalcommons.unl.edu/ceendiss/18/.

Https://www.sciencedirect.com/science/article/abs/pii/S2214860418310625.

Https://www.sciencedirect.com/science/article/abs/pii/S2214860416302834.

* cited by examiner

GANTRY-BASED ADDITIVE MANUFACTURING SYSTEM

FIELD OF THE INVENTION

Disclosed are embodiments of the invention that relate to, among other things, a system for additive manufacturing using a variety of cementitious materials.

Further disclosed are systems that allow for the additive manufacturing of any construction, such as, for example, buildings, structures, infrastructures, by means of a cartesian gantry system with automated supply of cementitious construction materials via a robotic nozzle that, when setting, form the vertical and horizontal elements that form a construction, as well as the electric and electronic installations necessary for moving the nozzle through which the slurry or flowable material passes.

SUMMARY OF THE INVENTION

An additive manufacturing system includes a gantry architecture with three orthogonally oriented beams along the X-, Y-, and Z-axes. The first beam (X-axis) and second beam (Z-axis) are configured to translate with respect to each other, while the second beam and third beam (Y-axis) are further configured to both translate and rotate relative to one another. A computer-controlled printing system is mounted to the first beam and includes at least one nozzle capable of depositing construction material suitable for building habitation structures. This configuration supports large-scale, spatially dynamic 3D printing.

Building on the gantry system of claim 1, at least one sensor or camera is integrated onto one of the three beams to monitor the activity of the nozzle. This feedback mechanism allows the system to analyze print behavior and dynamically adjust operations for improved precision or material control.

In an exemplary embodiment, the camera or sensor is located directly on the printing system itself, adjacent or connected to the nozzle. This enables real-time monitoring of material deposition at the point of extrusion, providing more immediate and localized data for feedback loops.

In another exemplary embodiment, the camera or sensor is mounted on the second beam (Z-axis). This arrangement supports overhead or angular observation of nozzle activity, potentially allowing broader field-of-view analysis for higher-level printing diagnostics or large-format print tracking.

Further expanding the configuration, the system includes at least three sensors or cameras on the printing system, including at least one directly coupled to the nozzle. This setup allows for comprehensive monitoring from multiple vantage points, enhancing quality control and enabling multi-axis feedback for precision fabrication.

The system includes the ability to controllably position the second beam at an angle less than 90 degrees relative to the third beam. This flexibility allows the gantry to operate on non-orthogonal planes or adapt to uneven terrains or irregular build environments.

As a specific variation, the second beam can be aligned parallel to the third beam. This arrangement can be used for redundant travel paths, overhead crossbeams, or synchronized vertical-lateral motion when constructing complex or multi-level habitation structures.

The system further includes a computer-controlled batching station interconnected with the printing system to deliver the construction material. The batching station regulates the material mixture or flow, supporting consistent extrusion and on-demand mixing of additive materials.

Sensors or cameras are not limited to the printhead but may also be located on any of the beams or the batching station. This allows distributed sensing throughout the system for a complete view of material flow, component movement, and coordination across sub-systems.

In one interdependent permutation, a first sensor on one of the beams monitors nozzle activity, while a second sensor on the batching station tracks material preparation. The system coordinates activity such that data from the batching station governs actions at the nozzle—e.g., delaying extrusion until material is ready or within spec.

Conversely, the system may operate such that sensor data from the nozzle controls the batching station. For example, a pause or change in nozzle output could prompt the batching station to adjust flow rate, mixing ratios, or pause material delivery altogether.

The system may further include a mister located near the nozzle. The mister provides environmental or material conditioning (e.g., moisture regulation, curing enhancement), and is integrated to operate synchronously or in coordination with the printing system.

To manage interaction between the mister and the nozzle, sensors or cameras may be located on any of the beams or the mister itself to monitor activity at the nozzle. This enables refined environmental control to maintain print quality, especially in variable outdoor or multi-material builds.

In a more integrated embodiment, the activity of the mister is directly controlled by data from sensors monitoring the nozzle. For instance, misting intensity or frequency may vary based on extrusion rate, material temperature, or layer cooling requirements.

The most complex feedback configuration links the mister, nozzle, and batching station, each with respective sensors. Activity at the mister is modulated based on both nozzle sensor data and batching station sensor input, enabling multi-point control that considers both material preparation and deposition in real-time.

This embodiment consolidates the full range of system elements: a three-axis gantry with a printing system on the X-axis beam, a batching station that feeds the nozzle via a conduit, sensors at both the nozzle and batching station, and an AI-driven control module. The control module receives feedback from both sensing locations and issues instructions to the printing system and/or batching station based on live data, enabling predictive and adaptive manufacturing control.

The AI control module governs not only binary behavior (start/stop) but also issues dynamic instructions such as adjusting the batching mix, repositioning the nozzle along the X-, Y-, or Z-axis, or modifying extrusion speed in response to sensor feedback. This creates a self-optimizing construction platform.

The AI-controlled system may also allow rotational motion between the second and third beams, providing additional spatial degrees of freedom for angled or curved structure fabrication. The rotational capability increases versatility for non-linear building geometries.

The mister may be integrated into the first beam and operated as part of the AI-coordinated manufacturing process. In this scenario, the AI uses environmental or material feedback to adjust misting rates or target cooling or curing to specific nozzle states or positions.

The batching station and printing system are physically linked by at least one conduit, preferably running along the X-axis. This conduit allows for efficient, gravity-fed or pressurized material transfer directly to the printhead, preserving material consistency while enabling synchronized travel with the first beam.

An exemplary gantry-based additive manufacturing system may be comprised of a first beam along an X-axis, a second beam along a Z-axis, and a third beam along a Y-axis. In an exemplary embodiment, the first beam and the second beam are coupled so as to translate with respect to one another. Additionally, the second beam and the third beam are coupled so as to translate and rotate with respect to one another. Further additionally, a computer-controlled printing system may be coupled to the first beam and be configured such that the printing system has at least one nozzle configured to eject a material configured to build habitation structures.

In addition to or in combination with any other previously described embodiment, an exemplary gantry-based additive manufacturing system previously described may further comprise at least one camera or sensor on one of the first beam, the second beam, or the third beam to provide feedback of activity at the at least one nozzle.

In addition to or in combination with any other previously described embodiment, an exemplary gantry-based additive manufacturing system previously described may further comprise a computer-controlled batching station interconnected to the printing system.

In addition to or in combination with any other previously described embodiment, an exemplary gantry-based additive manufacturing system previously described may further comprise at least one camera or sensor on one of the first beam, the second beam, the third beam, or the batching station.

In addition to or in combination with any other previously described embodiment, an exemplary gantry-based additive manufacturing system previously described may further comprise electronic, mechanical, and/or pneumatic means for displacing the second beam at an angle less than 90-degrees with respect to the third beam.

In addition to or in combination with any other previously described embodiment, an exemplary gantry-based additive manufacturing system previously described may further comprise a transport hitch and motive units to allow for the gantry-based additive manufacturing system to be moved by automotive or other vehicular sources following folding of the second beam towards the third beam.

In addition to or in combination with any other previously described embodiment, an exemplary gantry-based additive manufacturing system previously described may further comprise a misting system disposed on or adjacent to the first beam, and in particular, the printing carriage. Further particularly, the misting system may comprise a plurality of misting units coupled to the printing carriage, and in particular, adjacent to the nozzle of the printing carriage.

In addition to or in combination with any other previously described embodiment, an exemplary gantry-based additive manufacturing system previously described may further comprise a computer control system that uses a combination of machine learning and artificial intelligence to operate one or both of the batching system and the printing head.

In addition to or in combination with any other previously described embodiment, an exemplary gantry-based additive manufacturing system previously described may be configured such that the at least one camera or sensor is on a component part of the printing system.

In addition to or in combination with any other previously described embodiment, an exemplary gantry-based additive manufacturing system previously described may be configured such that the at least one camera or sensor is on a component part of the batch system.

In addition to or in combination with any other previously described embodiment, an exemplary gantry-based additive manufacturing system previously described may be configured such that the at least one camera or sensor is on a component part of the mixing system.

In addition to or in combination with any other previously described embodiment, an exemplary gantry-based additive manufacturing system previously described may be configured such that the at least one camera or sensor is on the first beam.

In addition to or in combination with any other previously described embodiment, an exemplary gantry-based additive manufacturing system previously described may be configured such that the at least one camera or sensor is on the second beam.

In addition to or in combination with any other previously described embodiment, an exemplary gantry-based additive manufacturing system previously described may be configured such that the at least one camera or sensor is on the third beam.

In addition to or in combination with any other previously described embodiment, an exemplary gantry-based additive manufacturing system previously described may be configured such that the at least one camera or sensor is on the misting system.

In addition to or in combination with any other previously described embodiment, an exemplary gantry-based additive manufacturing system previously described may be configured such that the at least one camera or sensor is above the printing system.

In addition to or in combination with any other previously described embodiment, an exemplary gantry-based additive manufacturing system previously described may be configured such that the at least one camera or sensor is behind the first beam.

In addition to or in combination with any other previously described embodiment, an exemplary gantry-based additive manufacturing system previously described may be configured such that the at least one camera or sensor is under the first beam.

In addition to or in combination with any other previously described embodiment, an exemplary gantry-based additive manufacturing system previously described may be configured such that the at least one camera or sensor is a level sensor.

In addition to or in combination with any other previously described embodiment, an exemplary gantry-based additive manufacturing system previously described may be configured such that the at least one camera or sensor is humidity sensor.

In addition to or in combination with any other previously described embodiment, an exemplary gantry-based additive manufacturing system previously described may be configured such that the at least one camera or sensor is a machine learning camera.

In addition to or in combination with any other previously described embodiment, an exemplary gantry-based additive manufacturing system previously described may be configured such that the at least one camera or sensor is controlled by one of artificial intelligence or a machine learning algorithm.

In addition to or in combination with any other previously described embodiment, an exemplary gantry-based additive manufacturing system previously described may be configured such that the at least one camera or sensor is controlled by one of artificial intelligence or a machine learning algorithm, in particular, a random forest algorithm.

In addition to or in combination with any other previously described embodiment, an exemplary gantry-based additive manufacturing system previously described may be configured such that the at least one camera or sensor is on the second beam.

In addition to or in combination with any other previously described embodiment, an exemplary gantry-based additive manufacturing system previously described may be configured such that at least three cameras, sensors, or combinations thereof are located on the printing system, one of which is coupled to the at least one nozzle.

In addition to or in combination with any other previously described embodiment, an exemplary gantry-based additive manufacturing system previously described may be configured such that the second beam can be controllably positioned at an angle less than 90-degrees with respect to the third beam.

In addition to or in combination with any other previously described embodiment, an exemplary gantry-based additive manufacturing system previously described may be configured such that the second beam is configured to be parallel to the third beam.

In addition to or in combination with any other previously described embodiment, an exemplary gantry-based additive manufacturing system previously described may be configured such that the at least one camera or sensor includes a first camera or sensor on one of the first beam, the second beam, or the third beam, and a second camera or sensor on the batching station, wherein activity of the nozzle recorded by the first camera or sensor is controlled by activity at the batching station.

In addition to or in combination with any other previously described embodiment, an exemplary gantry-based additive manufacturing system previously described may be configured such that the at least one camera or sensor includes a first camera or sensor on one of the first beam, the second beam, or the third beam, and a second camera or sensor on the batching station, wherein activity at the batching station is controlled by activity at the nozzle that is recorded by the first camera or sensor.

In addition to or in combination with any other previously described embodiment, an exemplary gantry-based additive manufacturing system previously described may be configured such that the computer-controlled printing system further comprises at least one nozzle proximate to at least one mister.

In addition to or in combination with any other previously described embodiment, an exemplary gantry-based additive manufacturing system previously described may be configured such that at least one camera or sensor on one of the first beam, the second beam, the third beam, or the at least one mister to provide feedback of activity at the at least one nozzle.

In addition to or in combination with any other previously described embodiment, an exemplary gantry-based additive manufacturing system previously described may be configured such that the activity of the mister is controlled by activity at the nozzle that is recorded by the at least one camera or sensor.

In addition to or in combination with any other previously described embodiment, an exemplary gantry-based additive manufacturing system previously described may be configured such that the source of the fluid used for misting is conducted via at least two beams.

In addition to or in combination with any other previously described embodiment, an exemplary gantry-based additive manufacturing system previously described may be configured such that the source of the fluid used for misting is conducted via at least three beams.

In addition to or in combination with any other previously described embodiment, an exemplary gantry-based additive manufacturing system previously described may be configured such that the source of the fluid used for misting is conducted via a conduit that is coupled to the same conduit for the printing material.

In addition to or in combination with any other previously described embodiment, an exemplary gantry-based additive manufacturing system previously described may be configured such that the source of the printing material is conducted through a conduit that is maintained in a parabolic configuration via support lines coupled to the first beam.

In addition to or in combination with any other previously described embodiment, an exemplary gantry-based additive manufacturing system previously described may be configured such that the source of the printing material is conducted through a conduit that is maintained in a combination of various parabolic waves via support lines coupled to the first beam.

In addition to or in combination with any other previously described embodiment, an exemplary gantry-based additive manufacturing system previously described may be configured such that the support lines for the conduit for the printing material are coupled to the first beam via the printing carriage.

In addition to or in combination with any other previously described embodiment, an exemplary gantry-based additive manufacturing system previously described may be configured such that at least some of the features of the second beam can be disposed in the third beam when laid parallel therewith.

In addition to or in combination with any other previously described embodiment, an exemplary gantry-based additive manufacturing system previously described may be configured such that the carriage for the second beam translates along the third beam, but also can be angularly situated with respect to the third beam via the same support surface as that used for the translation.

In addition to or in combination with any other previously described embodiment, an exemplary gantry-based additive manufacturing system previously described may further comprise adjustable legs for the third beam to maintain leveling on uneven terrain.

In addition to or in combination with any other previously described embodiment, an exemplary gantry-based additive manufacturing system previously described may further comprise a computer-controlled batching station interconnected to the printing system with at least one second camera or sensor disposed thereon, wherein the activity of the mister is controlled by activity at the nozzle that is recorded by the at least one camera or sensor and activity at the batching station that is recorded by the at least one second camera or sensor.

In another exemplary embodiment, an exemplary gantry-based additive manufacturing system may comprise a first beam along an X-axis, a second beam along a Z-axis, the first beam being configured to translate along the second beam. The exemplary gantry-based additive manufacturing system may further comprise a third beam along a Y-axis such that it is configured to permit translation of the second beam thereon. Further, the exemplary gantry-based additive manufacturing system may further comprise a computer-controlled printing system coupled to the first beam, wherein the printing system comprises at least one nozzle configured to eject a material configured to build habitation structures. The exemplary gantry-based additive manufacturing system may further comprise a computer-controlled batching station for providing the material to the printing system. Still further, the exemplary gantry-based additive manufacturing system may further comprise at least one sensor or camera for recording activity at the at least one nozzle and at least one sensor or camera for recording activity at the batching station. Moreover, the exemplary gantry-based additive manufacturing system may further comprise an artificially intelligent control module that sends instructions to one of the printing system and the batching station based on the recorded activity from the at least one sensor or camera at the at least one nozzle and the batching station.

In addition to or in combination with any other previously described embodiment, an exemplary gantry-based additive manufacturing system previously described may be configured such that the artificially intelligent control module instructs one or more of a mix for the material to be ejected at the batching station, an X-axis, Z-axis, or Y-axis location of the at least one nozzle of the printing system, and a speed of ejecting the material.

In addition to or in combination with any other previously described embodiment, an exemplary gantry-based additive manufacturing system previously described may be configured such that the third beam and the second beam can rotate with respect to one another.

In addition to or in combination with any other previously described embodiment, an exemplary gantry-based additive manufacturing system previously described may be configured such that at least one conduit interconnecting the batching station to the printing system is operatively disposed about the X-axis.

Figure 1:
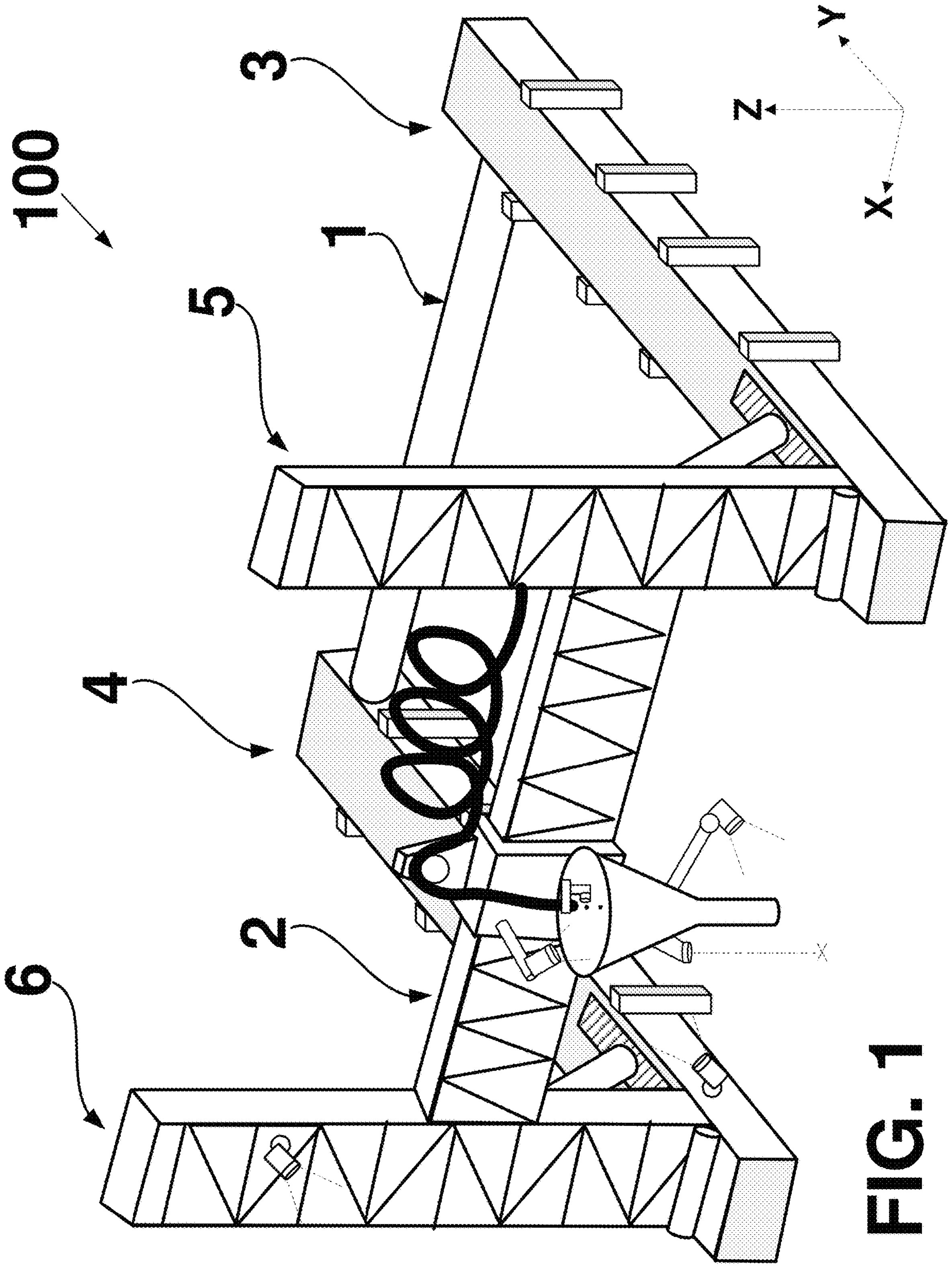
FIG. 1 illustrates a first embodiment of an exemplary gantry-based additive manufacturing system.

In the drawings like characters of reference indicate corresponding parts in the different figures. The drawing figures, elements and other depictions should be understood as being interchangeable and may be combined in any like manner in accordance with the disclosures and objectives recited herein.

DETAILED DESCRIPTION

With reference to the illustrative embodiment of FIG. 1, an exemplary gantry-based additive manufacturing system ("GBAM") may be comprised of a plurality of axes, preferably four axes, to enable the additive manufacturing of structures using cementitious materials. In a preferred embodiment, an exemplary GBAM may have a plurality of beams to enable movement of a nozzle to lay the cementitious material on a working surface. As illustrated in FIG. 1, an exemplary system 100 may comprise beam axes designated "X," "Y," and "Z." In an exemplary embodiment, the "X" axis beam 2 may be comprised of a cross-beam connecting two gantry towers or beams 5 and 6 located in the "Z" axis. Each gantry tower beam 5 and 6 may lay on a "Z" axis and be orthogonal to the cross beam 2, although in certain embodiments, an exemplary crossbeam may be displaced at an angle other than 90 degrees with respect to one or both of the tower beams 5 and/or 6. An idler beam 1 may rest along a "W" axis (not shown, but understood as an axis in a different plane from but otherwise parallel to the "X" axis). In an exemplary embodiment, the idler beam 1 may be separated from each carrier beam 3 and 4, which reside along the "Y" axis. In another exemplary embodiment, idler beam 1 may be a telescoping or otherwise length-modifying structure to allow the carrier beams 3 and 4 and/or cross-beam 2 to span different widths and obtain different spatial configurations. In one aspect, the idler beam 1 may be a series of telescoping pipes that slide within one another. In another aspect, the idler beam 1 may be a series of joined parts that can be tightened into an extended position and untightened to allow for a different position along the "W" axis. While the axes herein described and depicted may be illustrated as being orthogonal to one another, those skilled in the art may contemplate other angular relationships between the axes that will not depart from the scope of the inventions herein and would be readily understood and routinely applied by those skilled in the art. In a preferred embodiment, each of the idler beam 1, crossbeam 2, carrier beams 3/4, and tower beams 5/6 may be parts of an exemplary GBAM 100 that can execute work functions in a space having the following exemplary dimensions: 55.8 ft (17 m) by 72.8 ft (22.2 m) by 28.9 ft (8.8 m).

An exemplary GBAM 100 may be powered by at least five motors (e.g., 55/65 for Z-axis movement, 36/46 for Y-axis movement, and 230 for x-axis movement) and at least one spindle motor 240. In an exemplary embodiment, each of the at least three servo motors may be coupled to a planetary gear set. In an exemplary embodiment, servo motors may be dedicated to the Z-W axis, X-axis, and Y-idler beam axis. In a preferred embodiment, the at least one spindle motor may be coupled to a planetary gear set as well, such as, for example, planetary gears 241, 242, and 243. According to the instant embodiment, each servo motor may cause displacement via a powered pinion that is configured to engage a corresponding rack running along each of the gantry segments (e.g., beams, towers, and support gantries). In corresponding fashion to the aforementioned gantry axes, an "X" motor 230 may displace a printer carriage 22 along a track 25 on or within cross-beam 2 of the GBAM 100. A "Y" motor 55/65 may displace the gantry frame comprised of the "X" axis and "Z" axis forward and backward along tracks 35 and 45 about the print bead. The "Z" axis motors (571/671) may move the cross-beam "X" axis 2 upwardly and downwardly along tracks 54 and 64 in the direction along the Z-axis, as may be illustrated in FIGS. 3A. 3B, 3C, and 3D. The auger 205 interconnected to the cross-beam gantry X-axis may be controlled using the spindle motor 240 and its printer nozzle controlled by a "U" servo motor 230 that operates to rotate the nozzle 23 to align the print bead perpendicular to the direction of travel.

An exemplary printer nozzle 22 may descend from a print hopper carriage 21 and contain within it a spindle motor 240 running an auger 205 to feed mortar material through the printer nozzle 23. The auger 205 may comprise a plurality of diameters of Archimedes-type screw portions to convey material fed into the print hopper carriage 21 towards the exit of the nozzle 23. The print hopper carriage may 21 be movably connected along the cross-beam 2 of the GBAM 100 using a rack-and-pinion type connection (223 pinion to rack/track 25) or other incrementally controllable displacement mechanism(s). In an exemplary embodiment, the print hopper carriage 21 may be coupled to the motive component 223 of the rack-and-pinion (e.g., the gear) and the stationary toothed rack 25 may be maintained on the X-axis 2 of the GBAM 100. In a further aspect of this exemplar embodiment, the print hopper carriage 21 may further comprise a plurality of idler wheels 222 are visible and lie opposite a plurality of rubber wheels (not shown). The rubber wheels apply rolling contact to the X-axis gantry cross-beam 2 as the toothed rack 25 is engaged by the motorized rotating gear 223 of the print hopper carriage 21. Additionally, one of the plurality of rolling wheels 222 may be disposed within the housing 224 of the printing nozzle 22 to be sufficiently lubricated for ease of lateral displacement in the "X" axis direction and the other of the plurality of rolling wheels 222 may be partially within the print hopper carriage housing 224 and external to the print hopper carriage housing to allow for rolling contact in the X-axis direction but not be enclosed exclusively within the X-axis gantry 2. In a preferred embodiment, at least two of the plurality of idler wheels 222 may be at 90-degrees offset from one another.

In another exemplary embodiment, an exemplary hose or conduit for mortar 88 may be connected to the printer head hopper 21 via a connection 280 and suspended on or alongside the X-axis gantry cross-beam 2 via one or more hooks, pulleys, or clips 82 that are in rolling contact with a tension wire or line 83 drawn between the printer head 22 and either the Z-axis gantry, the W-axis gantry, or both. In this way, the tension wire 83 may be used to maintain an organized (e.g., unkinked) configuration of the mortar hose conduit 88 to reduce impediments to the printer head 22 feeding and operation. In an exemplary embodiment, the tension wire hooks 82 may maintain the mortar hose 88 in a substantially looped configuration (e.g., a bending in two planes) having a longitudinal axis substantially parallel with an axis running longitudinally through a centroid of the X-axis gantry 2, as may be illustrated in FIGS. 1 and 3A. In this exemplary arrangement, an exemplary spiral hose 88 may be advantageous to allow for the hose 88 to straighten along a line that is parallel to the X-axis as the X-axis gantry 2 is displaced upwardly in the "Z" axis direction. To avoid the mortar conduit 88 displacing at an angle away from the X-axis gantry 2, the tension wire 83 may provide alignment to the hose 88 and resist the tendency for the conduit 88 to want to drift (e.g., at an angle from the X-axis gantry beam 2 into the X-Y plane) as gantry 2 may be displaced upwardly in the Z-axis direction (e.g., as the hose 88 uncoils it creates "slack" as the X-axis beam is displaced further from the hose source of connection opposite that of the printer head 22).

Figure 2:
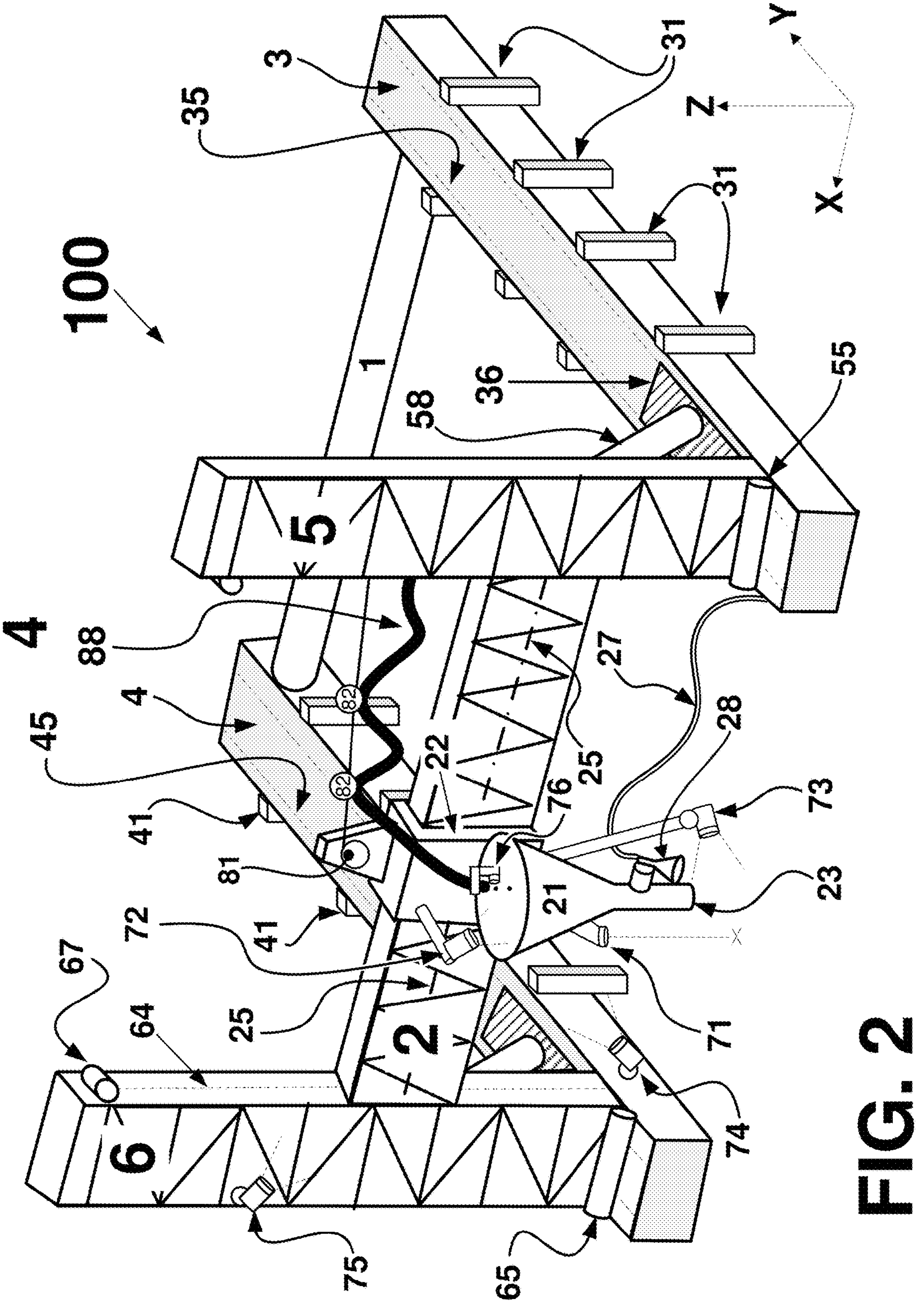
FIG. 2 illustrates a second embodiment of an exemplary gantry-based additive manufacturing system.

An exemplary line control or pulley system 81 may serve as either an alignment base for tension wire 83 and/or a motorized pulley configured to displace tension wire 83 and/or hooks/pulleys 82 for the conduit 88. An exemplary conduit 88 may be fabricated from known materials and with a variety of cross sections provided such designs being specifically adapted for reduced friction of flow of cementitious working material therethrough. However, conduit 88 may be made of other materials and take other forms assuming adequate flushing/cleaning of the conduit 88 takes place to avoid cementitious mix build-up. For example, an exemplary conduit 88 may be circular tubing to allow for advantageous bunching and control over displacement of the conduit 88 during use. According to such an exemplary embodiment, a conduit 88 may be used and any c material that may be deposited in the walls or other voids in the interior of the conduit 88 may be "flushed" using neutral fluids (e.g., water) pumped through at high pressures and thereafter released through low pressure valves located in series along conduit 88 until the tubing is clear. After the conduit 88 may be flushed according to this embodiment, the valves may be reconfigured to allow for cementitious material flow. Alternatively, according to the exemplary embodiment illustrated in FIG. 2, the rolling tension wire connection 82 between the mortar feed hose 88 and the X-axis gantry cross-beam 2 may enable the hose 88 to remain substantially draped along the same longitudinal line parallel to the X-axis despite Z-axis or Y-axis movement of the printer head 22. In this way, the design allows for a more compact printer head arrangement without numerous dangling materials during mortar deposition and printer head displacement in any direction (e.g., X-axis, Y-axis, and Z-axis displacement).

According to another exemplary embodiment, the "Y"-axis gantry beams 3 or 4 may each have a series of rolling surfaces with rotational displacement in the X-Y plane and a series of anchoring joints that translate in the Z-axis dimension to substantially fix the gantry at the point of anchoring. Thus, an exemplary gantry designed in accordance with these disclosures may be able to rotatably pivot to align with a particular printing bed or to accommodate changes in terrain or mortar deposition needs. While an exemplary rolling surface may be a set of wheels on rotatable mounts, the gantry systems described herein may be coupled to tires, dollies, or other rotational mechanisms having lubricated bearings or joints.

Figure 4B:
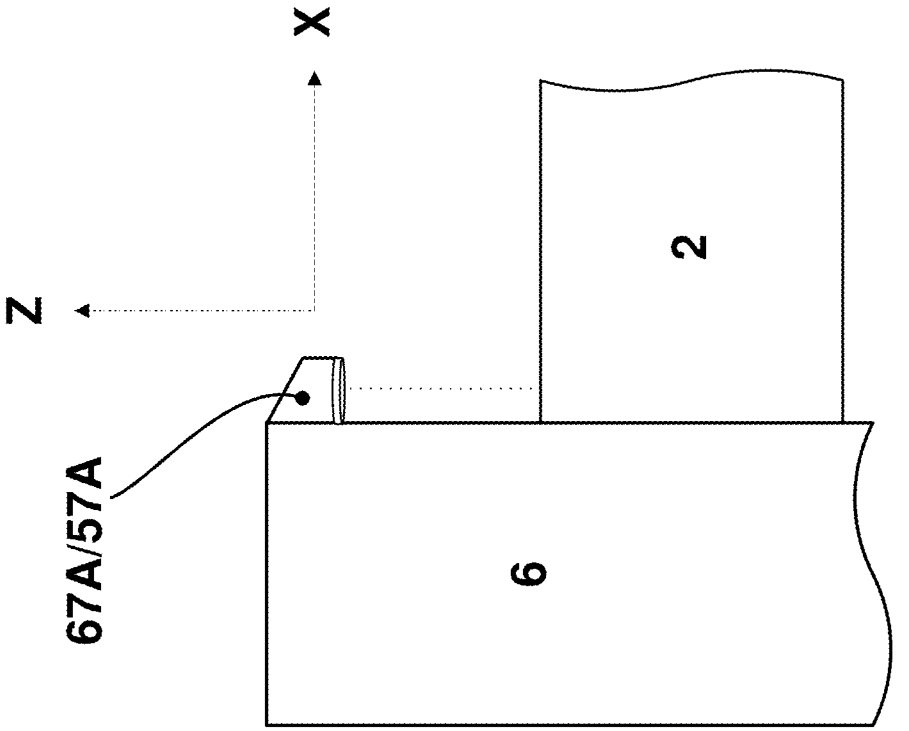
FIGS. 4A-B illustrates an exemplary Z-axis and X-axis displacement control embodiment for an exemplary gantry-based additive manufacturing system.
Figure 4A:
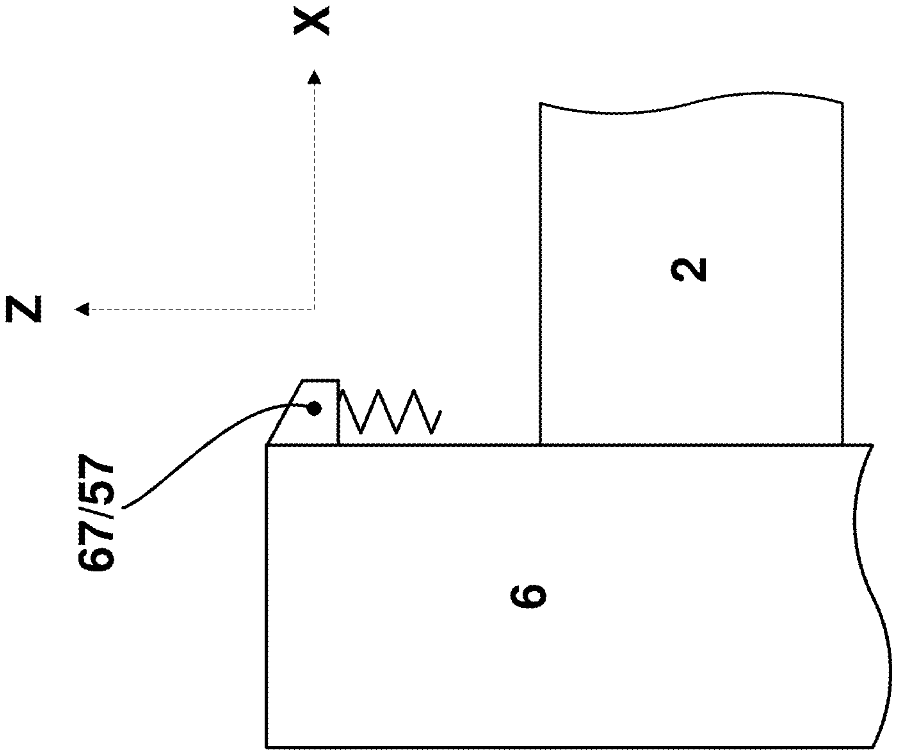
Figure 4D:
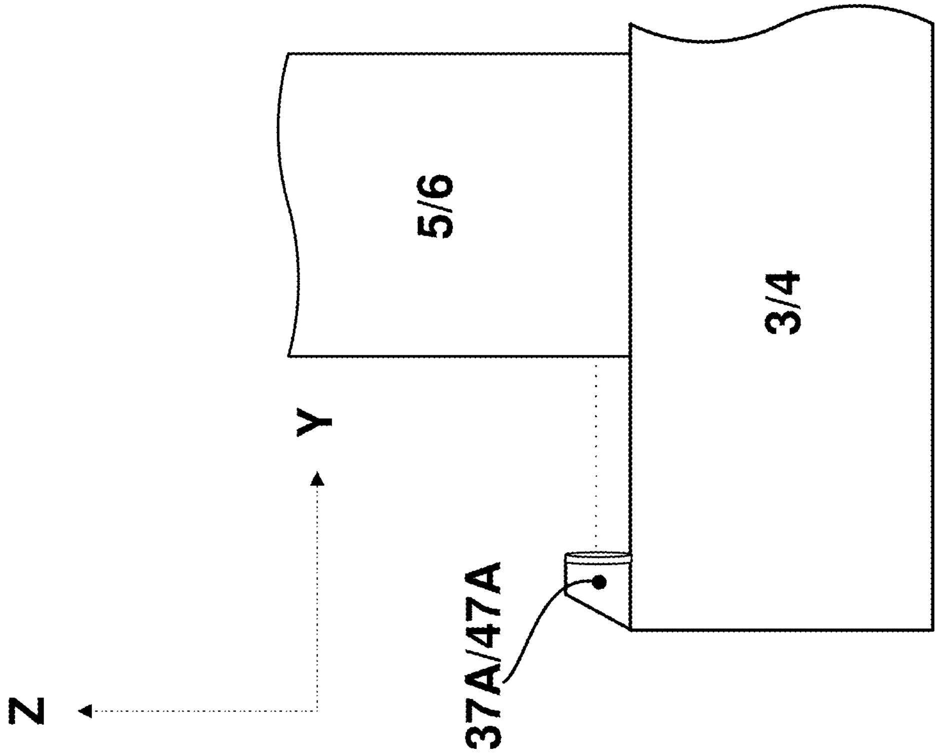
FIGS. 4C-D illustrates an exemplary Z-axis and Y-axis displacement control embodiment for an exemplary gantry-based additive manufacturing system.
Figure 4C:
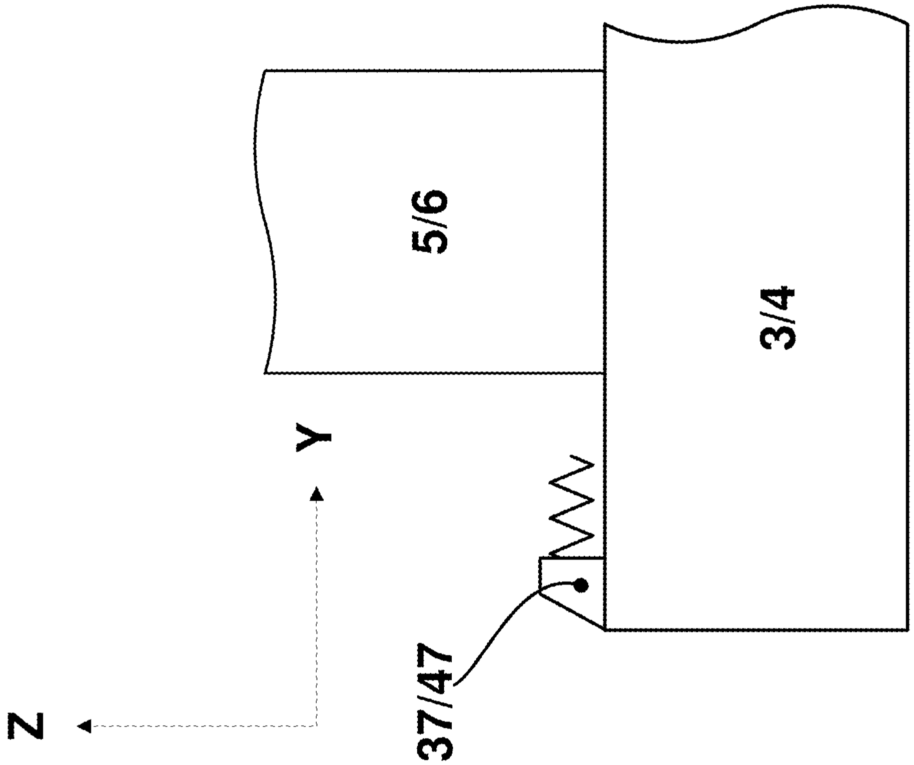

Referring to the embodiments illustrated in FIGS. 4A-D, it may be desirable to avoid over-travel of the various beams trusses 2-6 with respect to other beams and trusses located on different axes (e.g., prevent X-axis gantry from going beyond a certain height on the Z-axis). In one embodiment, a limit sensor 37/47/37A/47A/57/57A/67/67A may be applied to the GBAM 100 to prevent axis over-travel. As illustrated in FIGS. 4A-B, an exemplary limit sensor 57 or 67 may be a pressure or dampener-based sensor for preventing the X-axis gantry 2 from achieving an undesirable displacement along the Z-axis gantry 5/6, respectively. As illustrated in FIGS. 4C-D, an exemplary limit sensor 37 or 47 may be a pressure or dampener-based sensor for preventing the Z-axis gantry 5/6 from achieving an undesirable displacement along the Y-axis gantry 3/4, respectively. Additionally, an emergency stop feature may also be placed on the printer carriage 22 to achieve a similar result as described with respect to the limit sensors.

Referring to the illustrative embodiments of FIGS. 1-2, 5, 5A-C, and 6, an exemplary GBAM 100 may also be equipped with an integrated control system (ICS) 1000 comprising a machine-learning sub-system that may be the combination of at least one computing source and a server electronically linked to a plurality of cameras 71, 72, 73, 74, 75, and 76 located about the GBAM 100 to provide wired or wireless feedback (e.g., via Bluetooth, WiFi, or similar wireless data transfer technology 1002) for future operations and learning models and sensors in batch system 200. For example, a plurality of cameras 71-76 may be coupled to one or more of the various gantry structures 1-6 to provide operator feedback, iterative image and/or video capture of design builds, and quasi-autonomous and/or autonomous control of the additive manufacturing process. Additionally and alternatively, at least one of the plurality of cameras 71-76 may be used as part of a machine learning algorithm whereby images of portions of the build are used for determining next steps in the process, such as, for example, delivering more additive manufacturing fluid/filament to a desired area, application of material to level a particular section of the build, or deviating from a CAD model based on a real-world limitation not otherwise accounted for in the a priori information to the ICS 1000. In an exemplary embodiment, the ICS 1000 may receive via wireless means 1002 a set of data collected for deposited materials A1 through A7 and store this data as build set 1030 in ICS 1000 upon being recorded by cameras 71 and 73 and processed through computing system-server combination 1000. Exemplary materials A1 through A7 may be individual "beads" of extruded material from nozzle 22 or a layer or combination of layers of material extruded from nozzle 22. Alternatively, any one of A1 through A7 may be three-dimensional screen shots capable of being digitally dissected through known machine-learning algorithms to determine the quality of the mixture that produced the material properties observed in a particular data set A1, A2, A3, etc., the water content thereof, the appropriate mixing time, and the humidity and temperature of the surrounding space in which the material was fabricated and/or deposited. The aforementioned inputs and data recording mechanisms may be used as part of an iterative or artificial intelligence-based methodology of anticipating optimal building settings for the various parts of the GBAM 100 via the ICS 1000 and achieve ideal material deposits for a particular construction. In other words, the ICS 1000 may execute any known artificial intelligence protocols known to those skilled in the art or which can be routinely devised to take inputs from the activities of the various GBAM 100 components and use such inputs to reproduce desired results automatically during operation of GBAM 100 and/or cause to reproduce desired work material and/or work material qualities at an exemplary batching system or station 200 interconnected thereto.

Using the data gathered for work pieces A1 through A7 by each sensor/camera 71-76, or otherwise storing such data from prior routines, an exemplary batching system 200 (illustrated diagrammatically in FIG. 10) may then use iterative sampling via the same sensor/camera at different positions in the work space to control the creation of material B1, B2, B3, B4, B5, and all other materials (shown illustratively as B (n)). According to an exemplary embodiment, an exemplary material B1 may be laid onto the work site and checked by camera 71 for consistency with past work pieces (e.g., A1-A7). In this aspect, an exemplary material B2 may have been created and determined to be too dry by the cameras 71 or 73 coupled to nozzle system 22. In one embodiment, a bead B2 that may require additional moisture content can be misted using a mister 28 connected to a water conduit 27 via a tubular network 28A that is coupled to the nozzle output 23. In an exemplary aspect of this embodiment, water conduit 27 may be a hose that is aligned and/or attached to conduit 88 for the working material (e.g., cementitious material). According to one embodiment, the conduit 88 and water conduit 27 may be fluidly coupled in series via one or more valves to allow for timed flushing of conduit 88 using the same water supply used through water conduit 27. Alternatively, water conduit 27 may utilize the same tension wire 83 and couplings 82 for conduit 88 to traverse the gantry space as nozzle 22 displaces about the X-axis cross beam 2 between the Z-axis towers 5 and 6.

In another exemplary aspect of the GBAM 100, an exemplary camera or sensor 73 may be directed at the exit 23 of nozzle 22, but may otherwise engage in dynamic readings/recordings of the work done at exit 23 by way of articulation mechanisms 282, which may take the form of servo-based arms, rotating joints, pulley systems, or other moveable connections with specific feedback loops to ICS 1000 to control their starting and ending positions vis-à-vis exit 23. As illustrated, an exemplary camera 73 may be located on one side of nozzle 22 during production of a bead 82, but then move out of that position to allow for misting by mister 28 to avoid obstructions to camera 73 due to water spray or dust. Thus, an exemplary ICS 1000 may engage in controlled maneuvering of its various sensor mechanisms to ensure accuracy of the same during operation. Alternatively, or additionally, exemplary sensor camera 72 may be substantially stationary on nozzle station 22 to observe operation of auger 205 and the flow of cementitious material into hopper 21. Likewise, level sensor 76 may be focused on the flow of cementitious material from conduit 88. In a preferred embodiment, level sensor 76 may be a continuous level sensor. In this way, an exemplary GBAM 100 may incorporate a plurality of sensors that discriminate outputs by different system components and feed these separate inputs back to batching system 200 to determine how to control the amount and flow rates of the working fluids and materials at the location of the batch creation. In an exemplary embodiment, the following exemplary locations on a batch system 200 may have one or more sensors to provide data to the system 1000: Hopper inlet (e.g., to monitor incoming raw materials (cement, sand, additives)), Hopper walls/base (e.g., for level sensors to detect material levels (e.g., ultrasonic or capacitive)), Storage silo discharge chute (e.g., for weight sensors or flow sensors), Water input line (e.g., flow meters to ensure correct water-to-material ratios), Admixture input lines (e.g., flow or dosing sensors for plasticizers, retarders, etc.), Mixing chamber (e.g., for measuring batch temperature, moisture, viscosity, and torque sensors to monitor mixing consistency), Load cells under mixing vessel (e.g., for real-time batch weight monitoring), pH or conductivity sensors (e.g., for chemical composition feedback), Pump outlet (e.g., pressure sensors to monitor pump health and prevent clogging), Hose or conduit pathway (e.g., flow rate sensors and pressure drop sensors to detect blockages), Inline temperature sensors (e.g., to monitor material temperature during transfer), and Valve locations (e.g., position sensors to verify actuation and routing direction).

Figure 10:
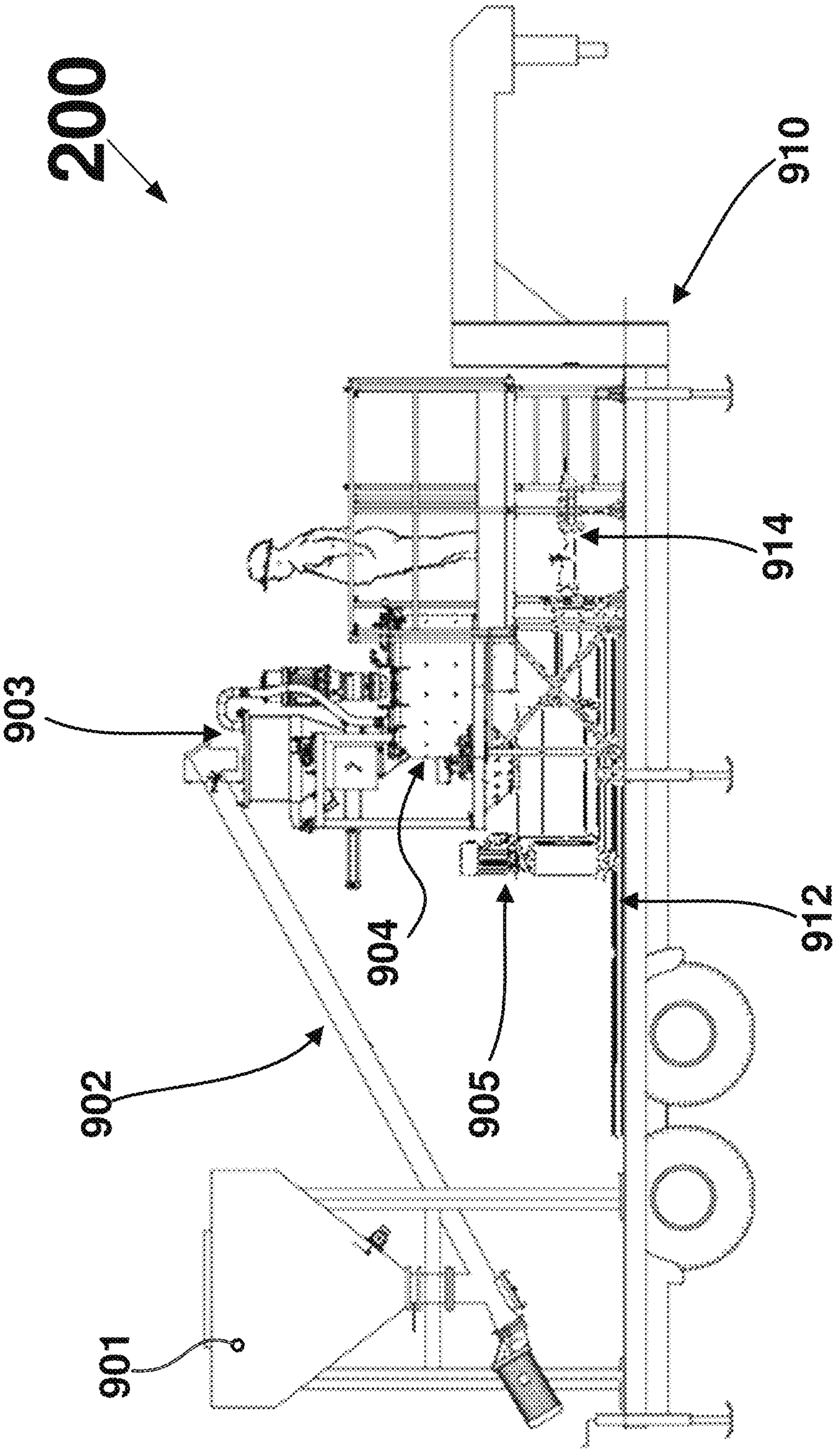
FIG. 10 illustrates an exemplary diagrammatic illustration of an exemplary batching system for an exemplary gantry-based additive manufacturing system.

Referring to FIG. 10, an exemplary batching station 200 may comprise platform 910 on which there is a bulk bag unloader 901 for a first component of an exemplary working material, a screw-type or other conveyance conduit 902 (e.g., a flexi-feeder) that delivers the component from bulk bag unloader 901 to a weigh hopper 903 via a versi-feeder system to the flexifeeder 902. Alternatively, bulk bag unloader 901 maybe configured as a silo. A planetary mixer 904 receives the component from bulk bag unloader 901 as well as additional material components, such as water, via a water valve train 914, and further processing sections, such as concrete pump 905. When the batch station 200 may require movement, an exemplary component rail system 912 may be located on the floor of the platform 910 for case of transporting and moving different station 200 modules into position as well as for routine maintenance and/or replacement. In an exemplary embodiment, the water valve train 914 may obtain source water from a tank stored below or within platform 910.

While any form or type of working material may be usable in an exemplary GBAM system 100, the system may make specific use of a pre-blended cementitious mortar. An exemplary pre-blended mortar may be formed by the following process: dispensing pre-blended cementitious mortar from a bulk bag unloader 901 to a weigh hopper 903, discharging weighed material from weigh hopper 903 into a mixer 904, storing water and adding water by volume via valve train 914 into the mixer 904, mixing pre-blended cementitious mortar with water, discharging mixed mortar to a pump hopper known to those skilled in the art, pumping material through concrete hose 88 to a print hopper carriage 21, and collecting dust from the process via dust extractor 905. In an exemplary embodiment, a high-shear planetary mixer 904, such as a planetary mixer, may be used to mix water and add-mixtures with a pre-blended dry mortar to form a homogenous mortar capable of 3D printing structures, which may be automatically discharged at cycle completion. In an exemplary embodiment, mortar from the batch plant 200 may be conveyed through a hose 88 using an open-hopper progressive-cavity mortar pump. An exemplary dosing valve train 914 may be used to add a defined amount of water to a pre-blended dry mortar in the mixer. In one exemplary aspect, water dosing may be based volumetric dosing by flow totalization. The amount of water in the mix is controlled by the operator by inputting a recipe to the operator interface. Information from the machine learning system will provide the user with modifications to be made to the mix to maintain print conditions. Measurements taken directly on the system, such as the moisture probe in the weigh hopper, allow for the system to automatically adjust the water content added to maintain desired output from the mixer.

In an exemplary embodiment, once the bulk material is sufficiently mixed, a hydraulically actuated discharge gate may open to allow the mortar to fill the hopper of the mortar pump. In another exemplary embodiment, a bulk-bag unloader may be used to hold a quantum of material to be conveyed to the weigh hopper 903 by auger administration to be accurately measured along with the pre-blended dry mortar for dosing and discharge to the mixer 904, e.g., via a hydraulically actuated sliding valve 902. In another exemplary embodiment, a pulse-jet dust collector 905 may collect dust from a bulk bag unloader and mixer to reduce and/or eliminate risk of silica exposure using, e.g., compressed air for filter cleaning. An exemplary water reserve tank may be incorporated into the system platform 910 to store water to be used for mortar mixing and pre-chilling of water during hot weather builds. An exemplary mixer wash-down system may provide high pressure water to the mixer cleanout nozzle ring for mixer washing. Each of the above processes may be executed in a batch plant 200 to provide a consistent supply of mortar at the print head 23 in batch-continuous manner.

According to another exemplary embodiment, an exemplary integrated control system (ICS) 1000 may store a plurality of mortar recipes, such as, for example, ten or more recipes. An exemplary recipe may be based on (i) weight of dry mortar per batch (lbs); and (ii) moisture content (%). In one aspect of this exemplary embodiment, the ICS may engage in the following exemplary steps: (a) Dry Material Dose—addition of dry mortar mix to the mixer; (b) Mixing Interval—how long and at what speed the mixer is left to run; (c) Water Dose—addition of water to the mixer; and (d) Discharge—transfers mortar from the mixer to the pump hopper when called for by the ICS. According to this aspect, while mortar material is waiting for discharge it may remain in the planetary mixer slowly being agitated. In an exemplary embodiment, a default agitation speed may be used unless specified otherwise in the discharge step. In another exemplary embodiment, a standard mortar recipe may contain eight steps: mortar addition, dry mix, water addition, first mix, mortar addition, water addition, second mix, and discharge. However, an exemplary ICS 1000 may accommodate recipes of any number of steps.

An exemplary GBAM 100 may also be equipped with a misting system 28. An exemplary misting system 28 may spray water or other lubricating material onto the build as the GBAM 100 operates, as illustratively shown, for example, in FIGS. 2, 2A and 6. In an exemplary embodiment, a misting array 28A may be employed for use along one or more of the various GBAM 100 axes and be operated by a solenoid valve that controls the flow of water to the mist nozzle 28. In one aspect, there may be a series of water misting nozzles 28 on the X-axis and X-axis carriage 22, and in a preferred embodiment, there may be 29 mist nozzles 28 along the X-axis 2 spaced every 19" collectively referred to as an exemplary misting array 28A. In an even further preferred embodiment, there may be a plurality of carriage nozzles that are independent of the aforementioned misting array. In another exemplary embodiment, the misting array 28A may be activated from a toggle on a printer control cabinet or a printer control pendant as part of the ICS 1000. Accordingly, when exemplary misting nozzles 28 are activated, the nozzles 28 will turn on/off based on where a particular GBAM 100 axis is positioned or at a point in time during the particular print, e.g., nozzles 28 may activate when the X-axis/gantry cross-beam 2 is over the print bed/structure. An appropriately configured industrial computer within the ICS 1000 may map the printed build structures by tracking the location of the print nozzle while it is extruding mortar, such as, for example, the diagrammatic representations illustrated in FIG. 6 for build portions A1-A7 and B1-B5. In a preferred embodiment, ICS 1000 may be configured to keep a 2-dimensional array for determining misting schedules and requirements for current and future builds. Consequently, when the 2-dimensional array data indicates passage of the print nozzle 23 above a section of a build, the system may be configured to instruct exemplary misting nozzles 28 to open via their solenoid valves. In one aspect, an exemplary misting array 28A may be used for overnight misting, which may be controlled in terms of rate of mist, misting interval, and duration of misting. In an exemplary embodiment, the system 1000 may be configured to execute overnight misting to a "sure-mist" state whereby an exemplary misting nozzle 28 may traverse a particular gantry axis (e.g., X-axis) 2 at a rate that is different from and not divisible by that of another gantry axis (e.g., Y-axis) 3/4. Accordingly, an exemplary "sure-mist" state may be employed if the carriage 22 cannot be set to the min/max of the X-axis 2 to ensure reduced presence of dry spots in the build (e.g., the dry spot B2 in FIG. 6). In another exemplary embodiment, exemplary misting nozzles 28 in the misting array 28A may automatically deactivate when the print carriage 22 passes beneath them by use of one or more hall-effect sensors, proximity sensors, or other detection means known to those skilled in the art coupled to the nozzles or remotely located but in proximity to the nozzles.

Figure 2A:
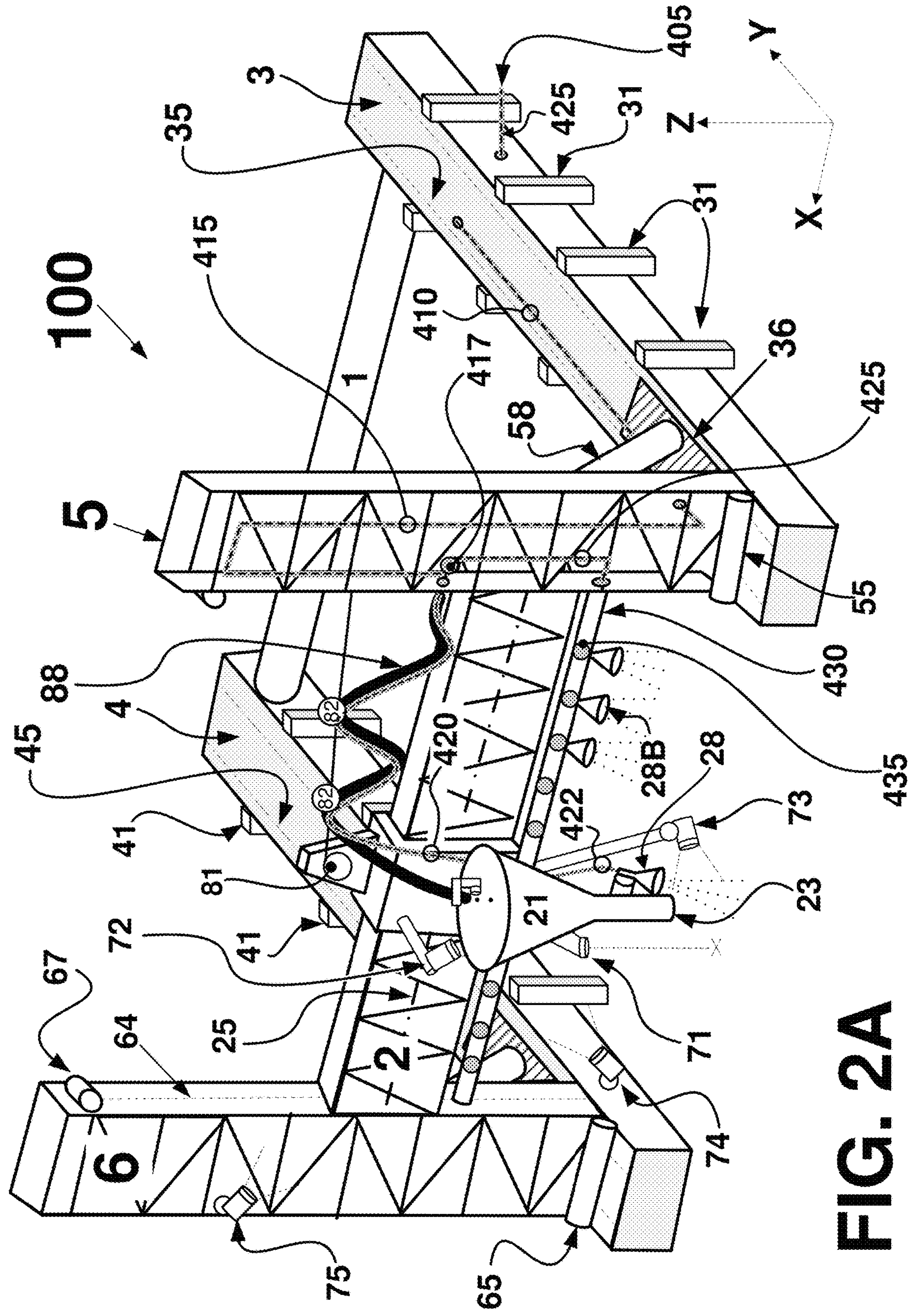

In another exemplary embodiment, as may be depicted in FIG. 2A, a plurality of misting nozzles 28B may be coupled to a common conduit, e.g., a Loc-line hose, 430 and a plurality (e.g., four) solenoid valves 435 may be activated by use of a special function, e.g., a machine coolant MCode, which may signal a normally closed solenoid valve, e.g., valve solenoid 417 to open and provide water flow to the misting array 28B located out of displacement range of X-axis carriage 2. It is contemplated that downstream of the aforementioned misting nozzles 28B, three normally open solenoid valves 435 would otherwise be able to control flow to these misting nozzles 28B. In an exemplary embodiment, the source of misting fluid to both the X-axis carriage 22 and the conduit 430 for misting array 28B, as well as all other misting arrays disclosed herein, (e.g., source 405) may be located upstream of the misting arrays 28, 28A, and 28B within an appropriately configured orifice or channel in the Y-axis gantry for flow portion 425. In an exemplary embodiment, a flow portion 410 may be disposed on or within the Y-axis gantry and be diverted through one of the Z-axis towers, which as illustrated in FIG. 2A is Z-axis tower 5. In an exemplary embodiment, the mist fluid may be channeled through flow portion 410 into the Z-axis tower 5 under pressure or otherwise pumped to a height through flow portion 415 within the Z-axis tower 4/5 so as to maximize the Bernoulli effect for the downstream pressure and mist fluid velocity at the arrays 28, 28A, and 28B. As may be further illustrated by FIG. 2A, an exemplary flow portion may divert at valve 417 to either printer carriage 22 misting array 28/28A via flow portions 420 and 422 (which was previously discussed with respect to FIGS. 2 and 6). It should be understood that unlike the flow line 27 in FIG. 2, an exemplary flow portion 422 may be located out of the way of moving parts, e.g., sensors and/or cameras used by printer carriage 22, to be conservatively mounted to or contained in close proximity to the printer carriage 22 and nozzle 21. Additionally and/or alternatively, mist fluid may be enabled to flow through valve 417 through flow portion 425 to enter the conduit 430 whereby X-axis misting array 28B may be enabled to mist the work space.

Figure 6:
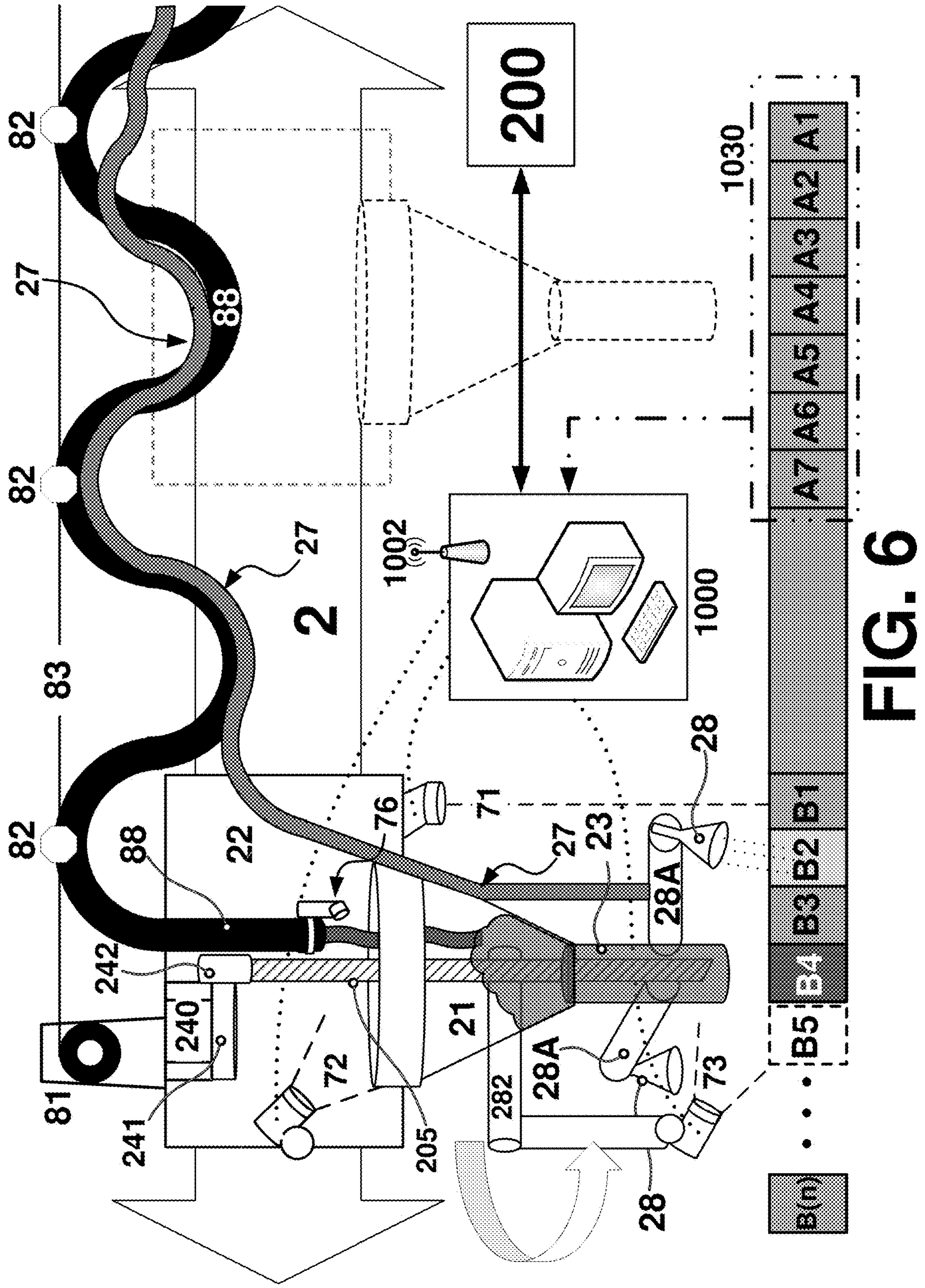
FIG. 6 illustrates an exemplary diagrammatic illustration of the interconnected and cooperating components and modules of an exemplary gantry-based additive manufacturing system and exemplary diagrammatic outputs of the same.

In an exemplary work process flow, which may be illustrated in FIG. 6, an exemplary GBAM 100 may take a final structure set 1030 and automatically divide the intended final structure into a plurality of cross-sections, e.g. A1-A7. An exemplary GBAM 100 may automatically convert each of the plurality of cross-sections into a closed loop such that the printing of each section may be stored as a separate routine whose conditions may be stored via ICS 1000 for use in future build cross-sections, e.g., B1-B5. In an exemplary embodiment, the system 1000 employed to monitor the workspace through coordinated measurements taken at printing and mixing stations may employ a combination of artificial intelligence and machine learning using random forest algorithms, with Gini impurity criteria based on one or more of combinations of desired machine build, environmental conditions, viscosity of the cementitious material, and acceptability of a fixed number of prior-laid printed beads of material. The algorithm may otherwise use information gain or mean squared error as the criteria for the selection of appropriate outcomes according to the particular system 1000 architecture and programming. In an exemplary embodiment, the system 1000 may continuously collect real-time sensor data (e.g., temperature, vibration, layer height, extrusion speed) during printing and in response to actions taken by the system 1000 at either the printing nozzle 21 and/or mixing station 200, the system 1000 may utilize artificial intelligence models known to those skilled in the art to identify defective extrusions, acceptable extrusions, and scrutinize the present extrusion based on these prior identified data. Based on the inputs and context of an acceptable extrusion and contrasting that with those of defective extrusions, the model may in real time predict print defects in advance of their occurrence and augment either the batching process, mixing, printing, and/or misting features to correct or maintain a desired outcome while reducing the possibility of unwanted outcomes based on the modelling, e.g., the random forest algorithm. Alternatively, the artificial intelligence of the system 100 may take the outputs of the random forest algorithm whereby an identification of desirable parameters to achieve successful results and manipulate the inputs so as to achieve the desired outputs. Alternatively, the artificial intelligence may automatically select or recommend parameter sets for new print jobs, reducing trial-and-error.

In an alternative exemplary embodiment, the artificial intelligence may also be used to proactively schedule maintenance of the various components of GBAM 100 to reduce downtime, optimize performance of the various constituents of the system 1000, and/or achieve desired extrusions and/or batches of material. In a further alternative embodiment, system 1000 may use the random forest algorithm to determine areas of potential problems or material limitations based on the geometries of the build and other factors.

Artificial intelligence used in combination with the random forest algorithm may then use past prints and/or other a priori information to suggest automatic geometry adjustments or flag the model for human review at certain points in the build and/or delay human intervention at a point in time that optimizes the overall building task and/or speed of the final product.

According to another exemplary embodiment, mortar of any recipe may be transferred from an exemplary batch plant 200 to a hopper 21 of the print head 22 movably coupled to the GBAM 100, such as, for example, along the X-axis or gantry cross-beam 2. An exemplary print head hopper 21 may receive mortar from the batch plant 200 via an open-hopper progressive-cavity pump or other like mortar pump. In an exemplary embodiment, one or both of the print hopper carriage 21 and the mortar pump may contain sensors, such as non-contact continuous level sensors 72, to monitor limits of the hoppers 21 and/or serve as triggers for other automatic operations involved in the batching process among others. In an exemplary mortar pump hopper level control method, an exemplary material level for the pump hopper may be maintained using a plurality of level sensors dedicated to the pump hopper and the print head hopper 21. In an exemplary aspect, a sensed lower limit on the pump hopper may instruct the system to start mixing the next mortar batch. In an exemplary aspect, a sensed lower LOW limit on the pump hopper may instruct the system to discharge mortar. Conversely, a sensed high limit on the pump hopper may instruct the system to halt discharge step.

In an exemplary print hopper carriage level control method, an exemplary material level for the print hopper carriage 22 may be maintained using a plurality of level sensors, e.g., sensor/camera 72, dedicated to the pump hopper and the print head hopper 21. In a preferred embodiment, an exemplary sensor 72 may be controlling a VFD to modulate the mortar pump based on a measurement of material level at the print hopper carriage 21. In an exemplary aspect, a sensed lower limit on the print hopper carriage 21 may instruct the ICS 1000 to engage in a normal or average level control operation. In an exemplary aspect, a sensed lower LOW limit on the print hopper carriage 21 may instruct ICS 1000 to significantly increase mortar pump speed to within the range to achieve normal or average level of material volume in the print hopper carriage. Conversely, a sensed high limit on the print hopper carriage 21 may instruct ICS to await material usage to achieve normal or average levels or, in very high limits, turn off the mortar pump.

Figure 3:
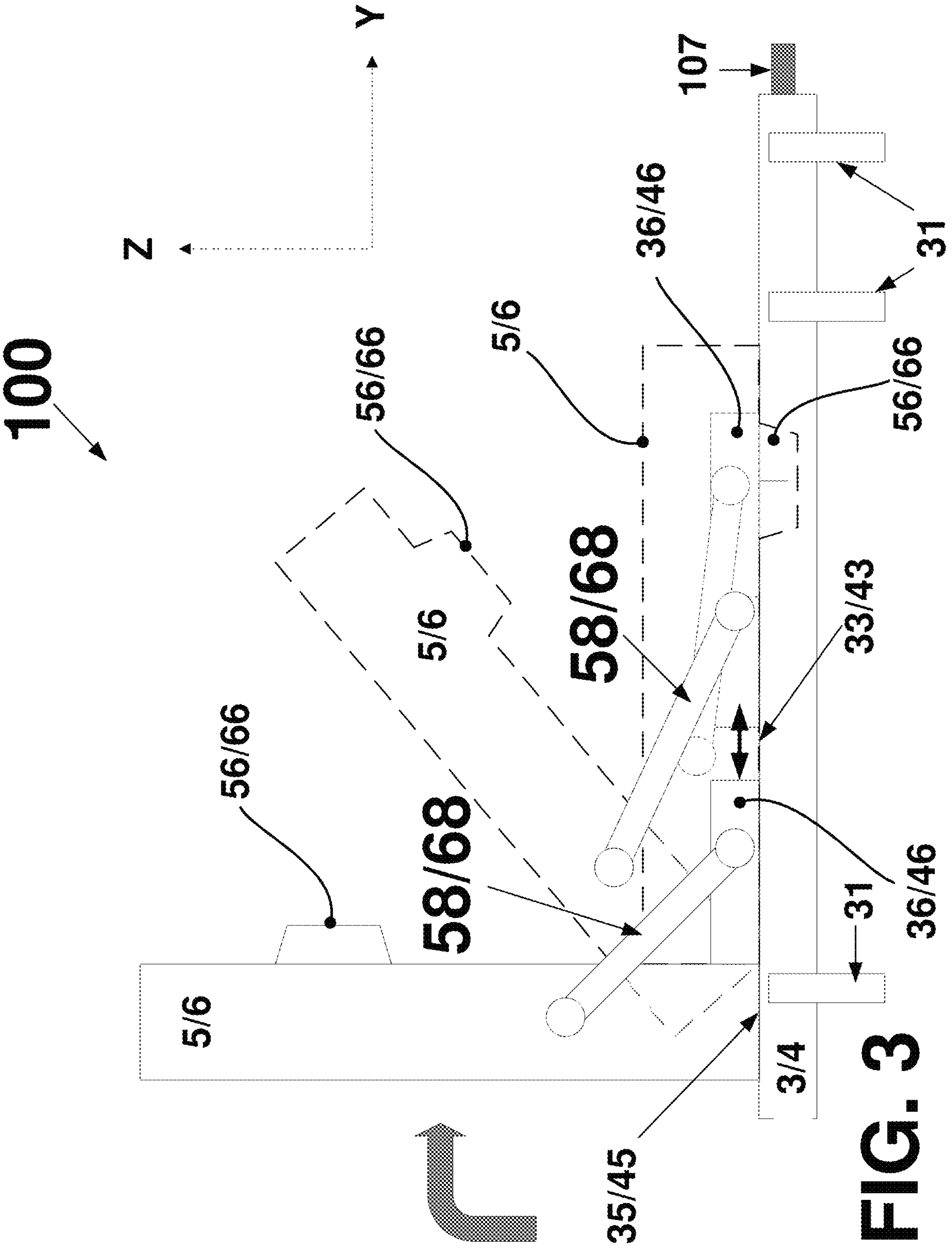
FIG. 3 illustrates an exemplary profile view of a third embodiment of an exemplary gantry-based additive manufacturing system.
Figure 3A:
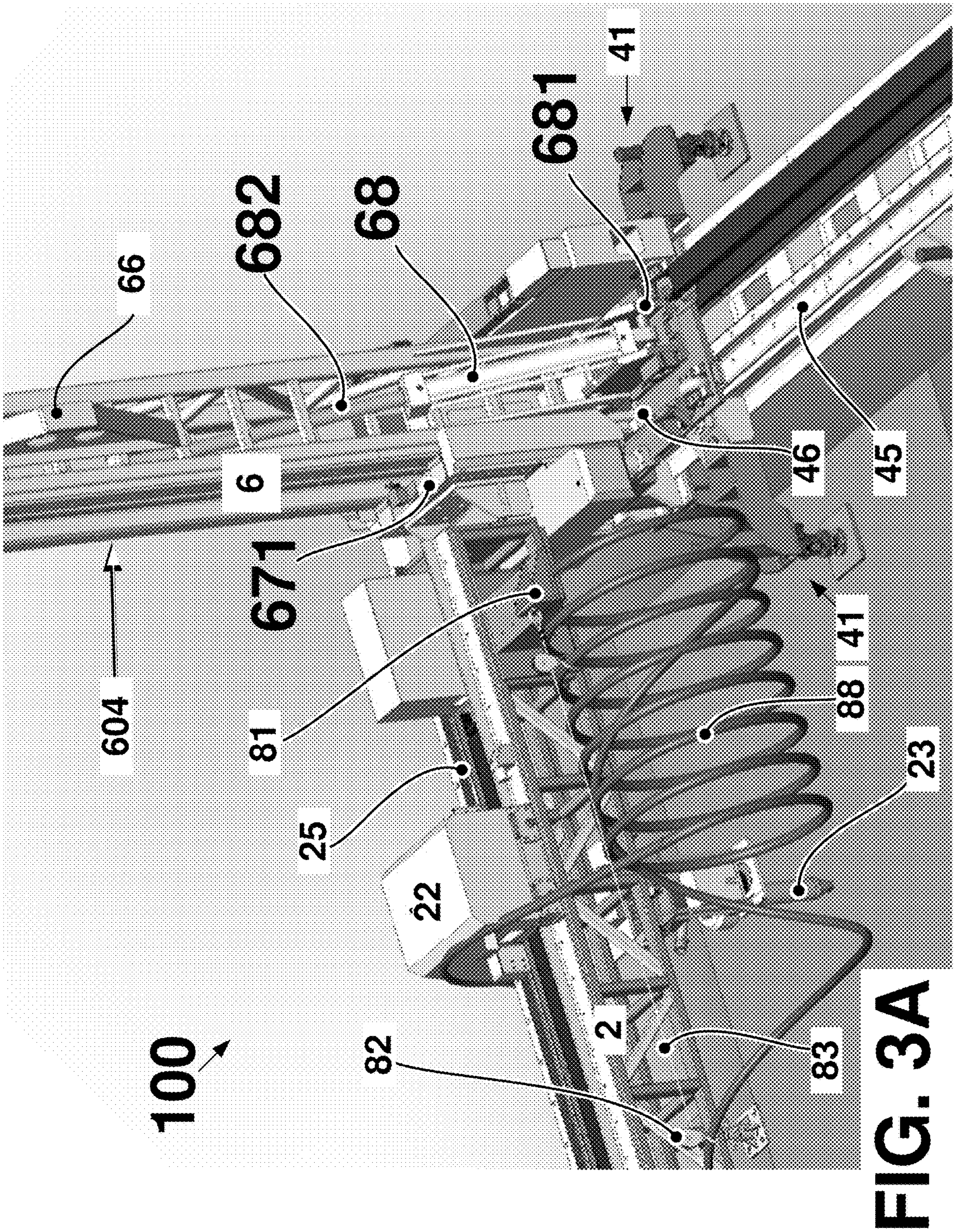
FIG. 3A illustrates an exemplary rear sectioned isometric view of a fourth embodiment of an exemplary gantry-based additive manufacturing system.
Figure 3B:
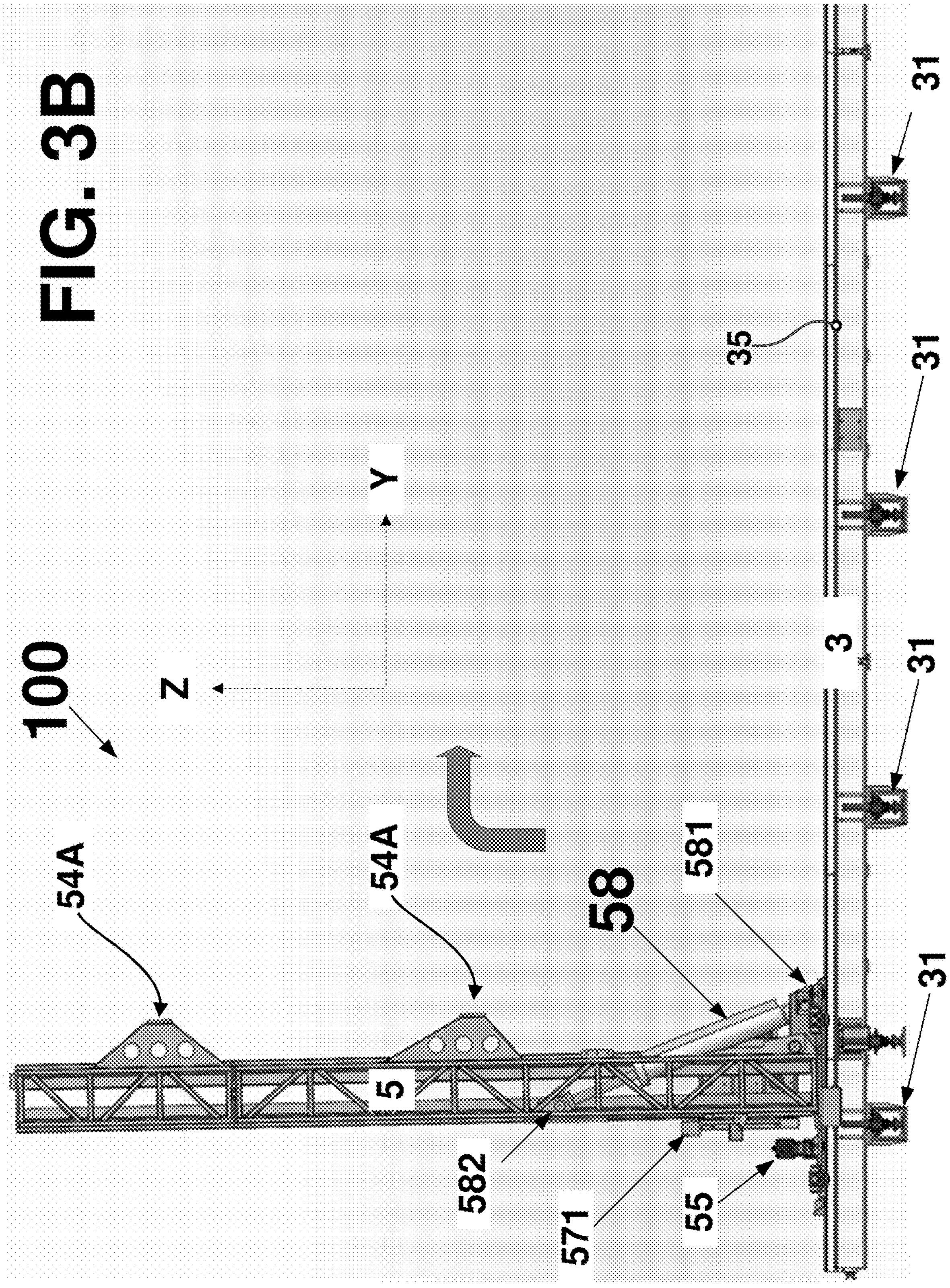
FIG. 3B illustrates an exemplary profile view of the fourth embodiment of an exemplary gantry-based additive manufacturing system.
Figure 3C:
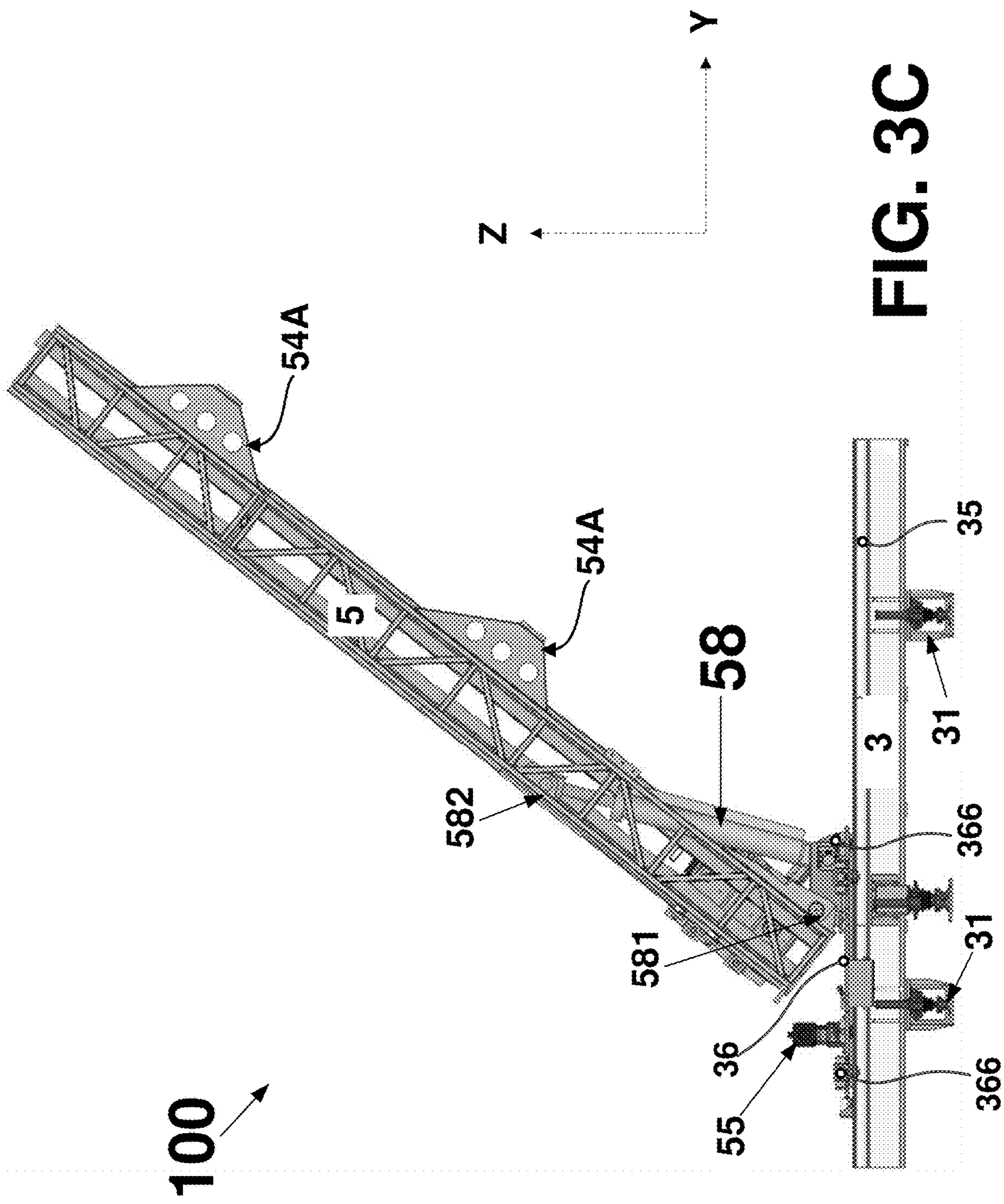
FIG. 3C illustrates another exemplary profile view of the fourth embodiment of an exemplary gantry-based additive manufacturing system.
Figure 3D:
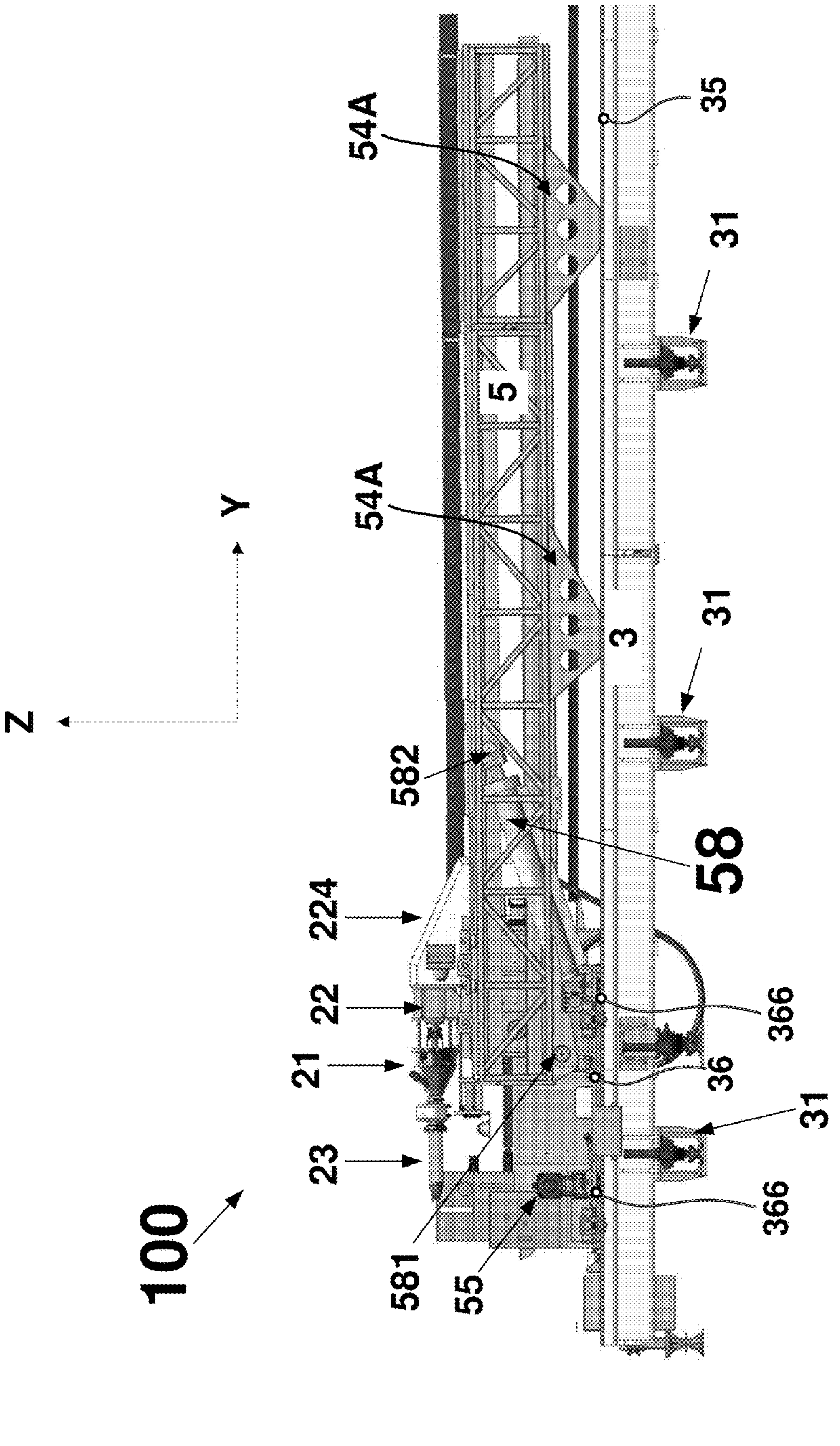
FIG. 3D illustrates yet another exemplary profile view of the fourth embodiment of an exemplary gantry-based additive manufacturing system.

As may be illustrated in FIGS. 3 and 3A-D, another exemplary aspect of the inventive GBAM 100 may be the ability of the gantry system to displace at angles other than 90 degrees with respect to any one axis. For example, as illustrated in FIGS. 3 and 3A-D, an exemplary z-axis tower 5/6 may be displaceable from an erect 90 degrees with respect to Y-axis base 3/4 (FIG. 3B) to an angle of approximately 45 degrees (FIG. 3C) to an angle of 180 degrees (FIG. 3D) by use of a hydraulically actuated piston 58/68 on a Y-axis track 33/43 and is motivated by a hydraulic power pack located on the Y-axis adjacent to the corresponding Z-axis tower 5/6. Sliding motorized servo 36/46 may cooperate with hydraulic controlled piston 58/68 via a rotatable coupling to servo at joint 581/681 and coupled to z-axis tower 5/6 at a rotation junction 582/682. In an exemplary embodiment, piston 58/68 may allow for z-axis tower 5/6 to be rotated towards the Y-axis track 33/43 while servo 36/46 displaces (e.g., translates) along track 33/43. As previously discussed, tracks 35/45 on the Y-axis 3/4 may be dedicated to translational (Y-axis only) displacement of Z-axis 5/6 about the Y-axis 3/4 while the Z-axis towers 5/6 (e.g., tracks 35/45 may only be used when Z-axis towers 5/6 remain at 90 degrees to Y-axis 3/4). In the case of the embodiments illustrated in FIGS. 3 and 3A-D, the Z-axis towers 5/6 may decouple from translational tracks 35/45 to enable the same to fold or angularly displace as illustrated. In an exemplary embodiment, piston 58/68 may be fully extended when the Z-axis towers 5/6 are in their operating positions (e.g., 90 degrees to Y-axis 3/4 as illustrated in FIG. 3B). Accordingly, the Z-axis towers 5/6 are in their at-rest/transport ready positions (e.g., substantially parallel to Y-axis 3/4) when piston 58/68 is in a compressed state. As may be illustrated in FIG. 3D, the tilting of an exemplary Z-axis tower 5/6 may also cause the same tilting of the X-axis 2 and its coupled components, such as the printer system 22.

In an exemplary embodiment a trapezoidal or other type of Z-axis tower support 56/66 may provide footing or other type of buffer structure or support between the gantry frame components 501/601 of the towers 5/6 and the folded repository 38 within the Y-axis track 3/4 when the Z-axis towers 5/6 are at rest following rotation to 180 degrees from the erect position, as may be illustrated in FIG. 3. While supports 56/66 may support the displaced Z-axis tower 5/6 via the Y-axis track 3/4, which itself is supported by a plurality of dynamic variable legs 31, in another exemplary embodiment, the Z-axis tower 5/6 may have its supports 56/66 engage the same support surface on which the legs 31 of the Y-axis track 3/4 rests. In an exemplary aspect, a Z-axis tower 5/6 whose support 56/66 may suspend the Z-axis tower 5/6 above the support surface or ground via Y-axis track 3/4 may provide an easier means of moving the folded gantry system in FIG. 3, e.g., by using a hitch or tow portion 107 coupled to the Y-axis 3/4. In other words, maintaining an exemplary folded Z-axis 5/6 away from the support surface may facilitate subsequent transport of the folded GBAM 100. In an alternative embodiment, rollers or wheels may be coupled to the supports 56/66 so that when the Z-axis 5/6 is folded into Y-axis 3/4, the wheels or rolling surfaces on supports 56/66 may come into direct contact with the support surface, raise legs 31 off of the support surface, and allow for immediate transport of the folded Z-Y combination of an exemplary GBAM 100. In this exemplary aspect, the passage of one or more supports 56/66 with wheeled means disposed thereon may allow the GBAM 100 to take on a folded "mobile" mode in which transport of the GBAM 100 may be more easily facilitated.

Figure 7:
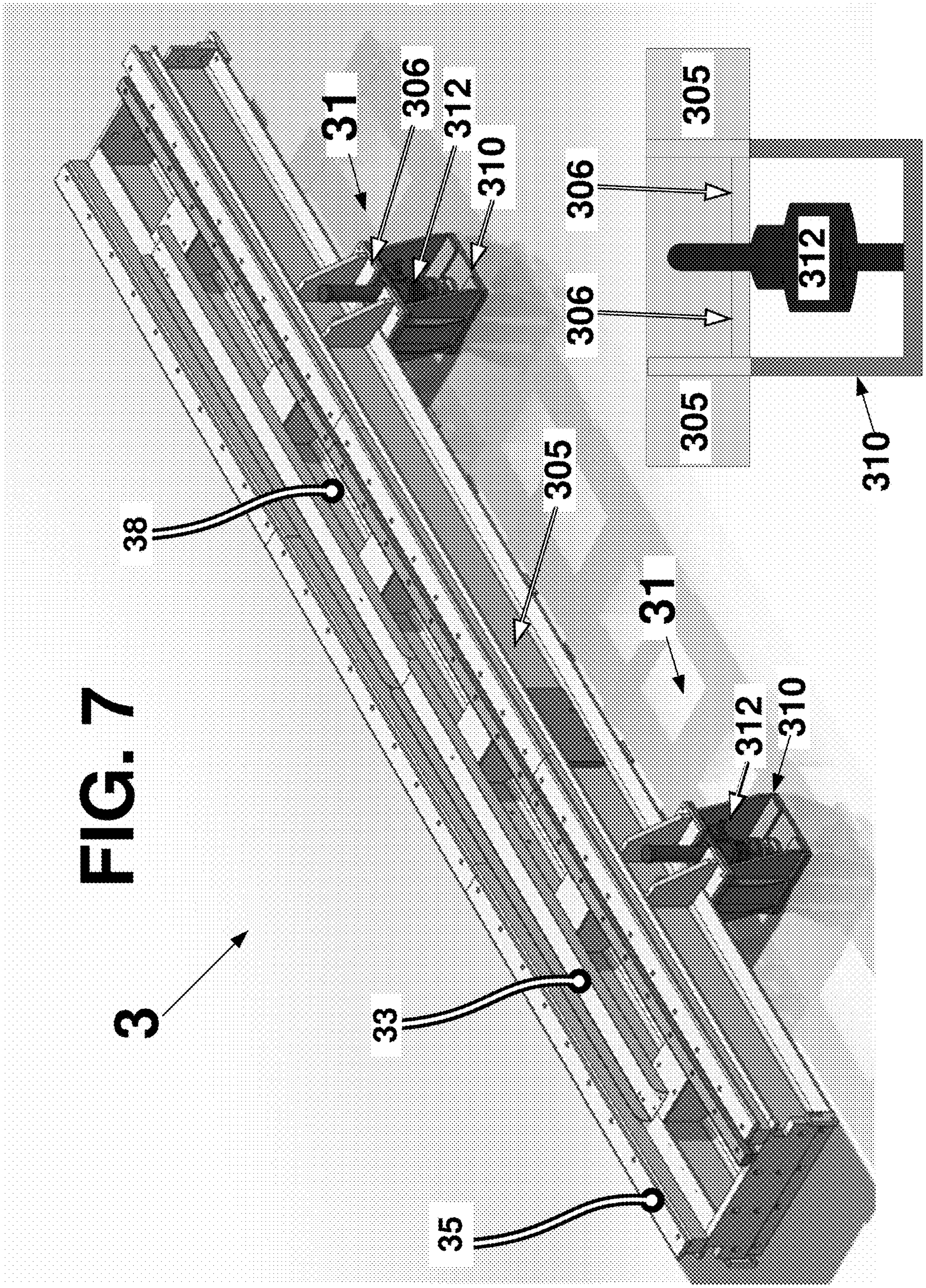
FIG. 7 illustrates an exemplary sectioned isometric view of an exemplary Y-axis component for an exemplary gantry-based additive manufacturing system.
Figure 8A:
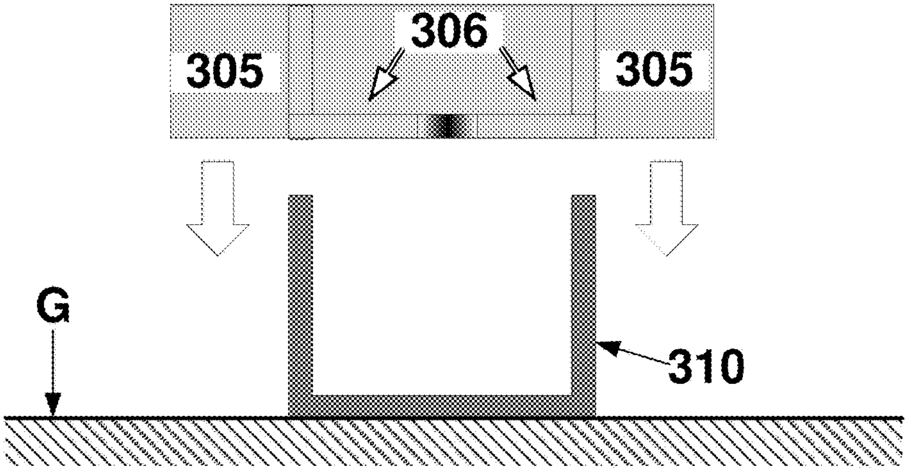
FIGS. 8A-C illustrate exemplary diagrammatic operations of exemplary components for an exemplary Y-axis component for an exemplary gantry-based additive manufacturing system.
Figure 8B:
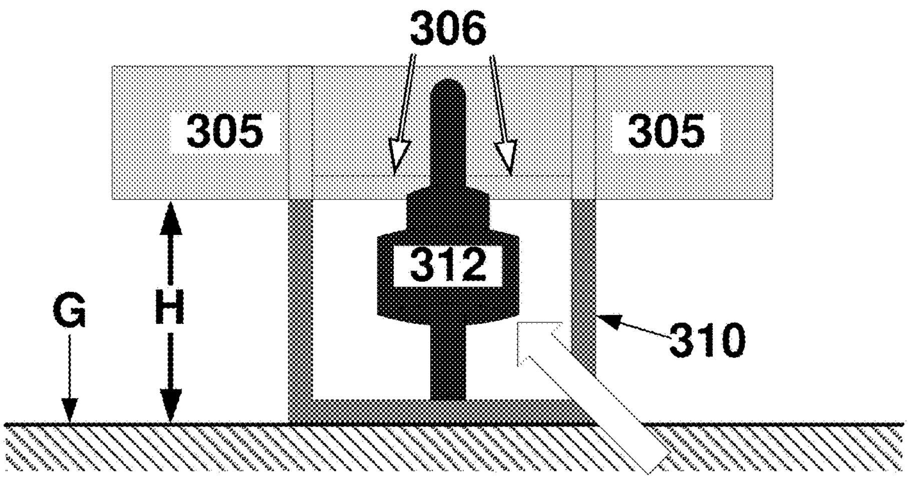
Figure 8C:
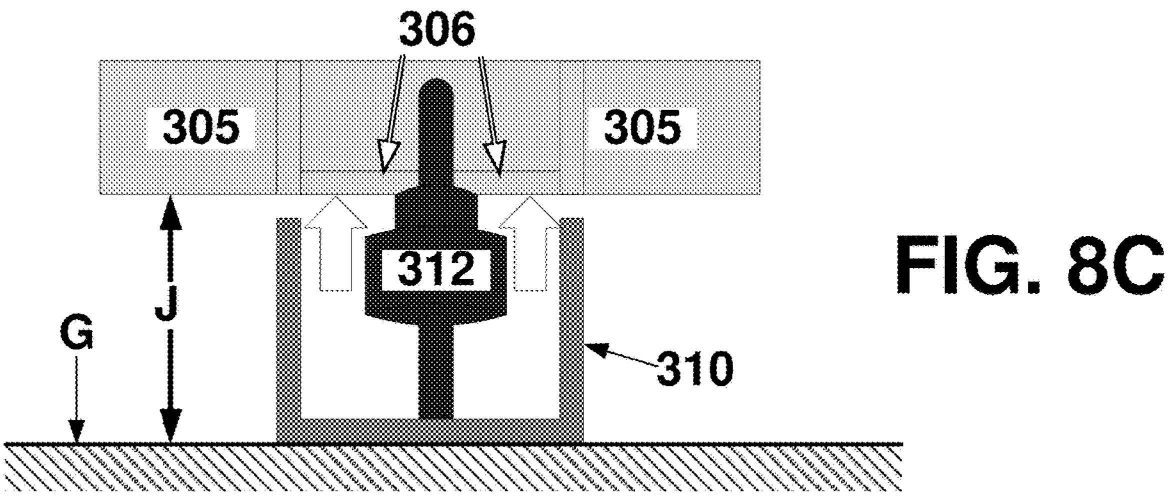
Figure 9:
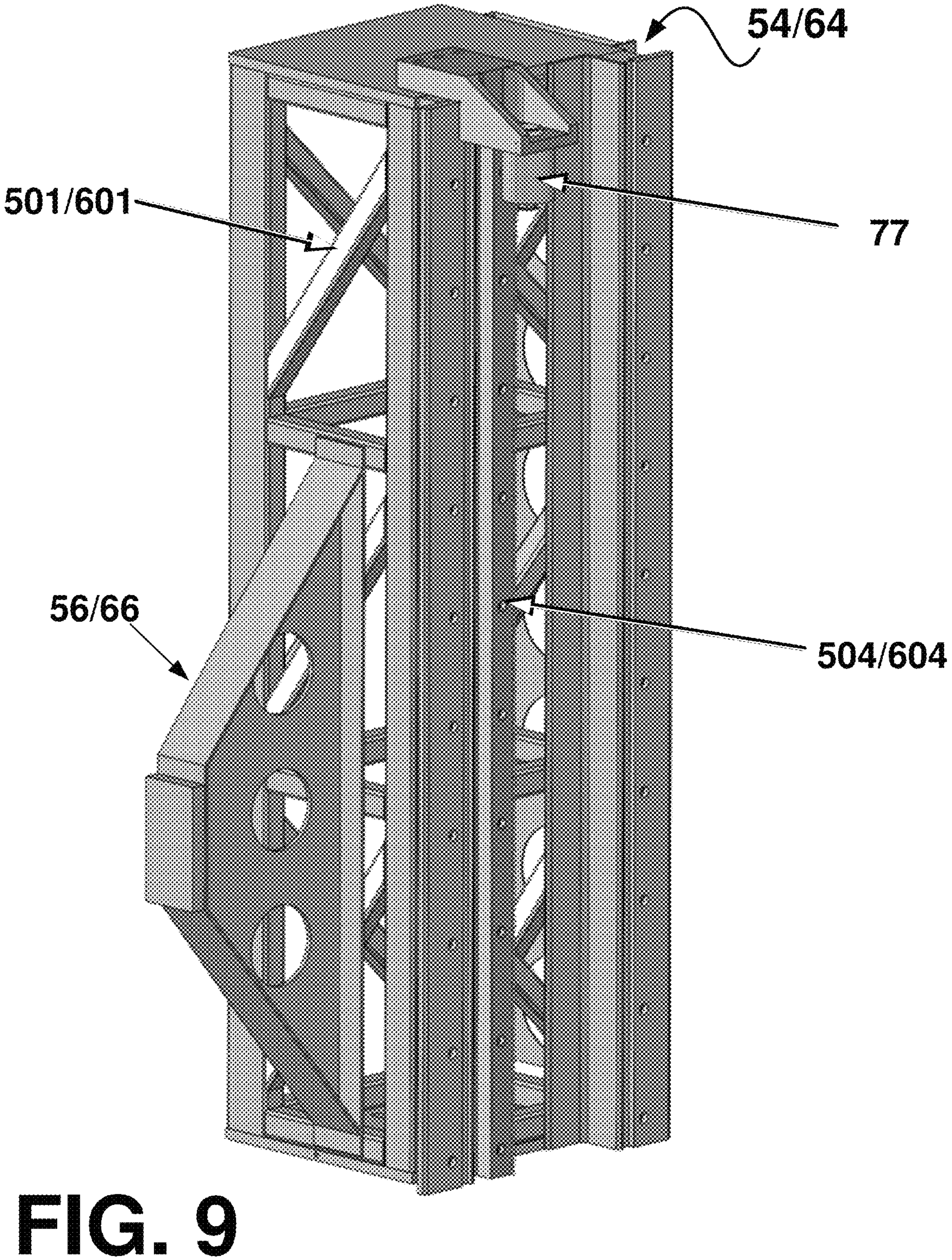
FIG. 9 illustrates an exemplary isometric view of a component of an exemplary Z-axis section of an exemplary gantry-based additive manufacturing system.

Referring to the illustrative embodiments depicted in FIG. 7, an exemplary Y-axis 3 may be shown having the dedicated Y-axis track 35, the motorized cable chain guide 33, and a plurality of legs 31. Each of the legs 31 may be comprised of a knee 306 coupled to the body 305 of the Y-axis 3. A foot 310 may be positioned underneath a displacement piston 312. According to an exemplary aspect as may be illustrated in FIGS. 8A-C, an exemplary leg 31 may allow for dynamic positioning and leveling of the entire GBAM 100 by virtue of adjustments to the piston 312. For example, as shown in FIG. 8A, an exemplary Y-axis 3 body 305 with knee 306 may be positioned over foot 310 resting on ground G. In FIG. 8B, an exemplary piston 312 may be inserted into the knee 306 and foot 310 by way of a channel in knee 306 and/or foot 310 so that a motive feature of the pump 312 may press upon a surface of the knee 306 and a surface of foot 310. As illustrated, piston 312 may position the Y-axis body 305 at a height "H" from the ground G. In FIG. 8C, an exemplary piston 312 may be acted upon to raise the knee 306, and likewise the body of Y-axis 3, from the height "H"

to a different height "J" above the ground G. Thus, it may be illustratively shown how a particular leg 31 of an inventive GBAM 100 may be controlled to vary the Y-axis 3 along its length to achieve precise positioning of the GBAM 100 on uneven ground.

With reference to FIGS. 5 and 5A-C, an exemplary printer system 22 may be comprised of several components that can be separated for maintenance and/or cleaning. For example, an exemplary ejection nozzle 23 may be decoupled from the remainder of system 22 (e.g., receiver portion 207A) by a clamp 207 (e.g., a pull latch clamp or toggle). Other alternative forms of clamp 207 and receiving portion 207A may be used to accomplish similar coupling/decoupling actions as would be known to those skilled in the art. Additionally, hopper 21 may be decoupled from system 22 at an upper end by lock latching mechanisms 217 and attachment points 217A, and decoupled from system 22 at a lower end by coupler 209. Further additionally, the auger 205 may be decoupled from system 22 by a lock latching mechanism 219, which is configured to engage receiving portions about structures extending outwardly from coupling shaft 219A. In an exemplary embodiment, the decoupling capabilities of the intermediary modules and components of system 22 may provide a number of advantages particular to large scale additive manufacturing involving cementitious materials. For example, the ability to decouple individual components may maximize the ability to clean the internal features of residual cementitious material that may be left over from a build routine. Hardened cementitious material may cause a loss of time and functionality, which ready and easy access to components of the printing system 22 by way of the aforementioned decoupling mechanisms aid. As another example, decoupling of the system 22 components may also aid in root cause analysis and maintenance of parts without having to detach the entire system 22 from the gantry cross-beam 2, which may be laborious and require recalibration of the entire GBAM 100 printing settings in ICS 1000. Thus, by allowing individual components of the system 22 to be detached separately or conjunctively, access to these components during builds is increased and maintenance/cleaning/analysis of the same is made more expedient without the typical decoupling of the system 22 from the remainder of the already calibrated system 100.

Figure 5:
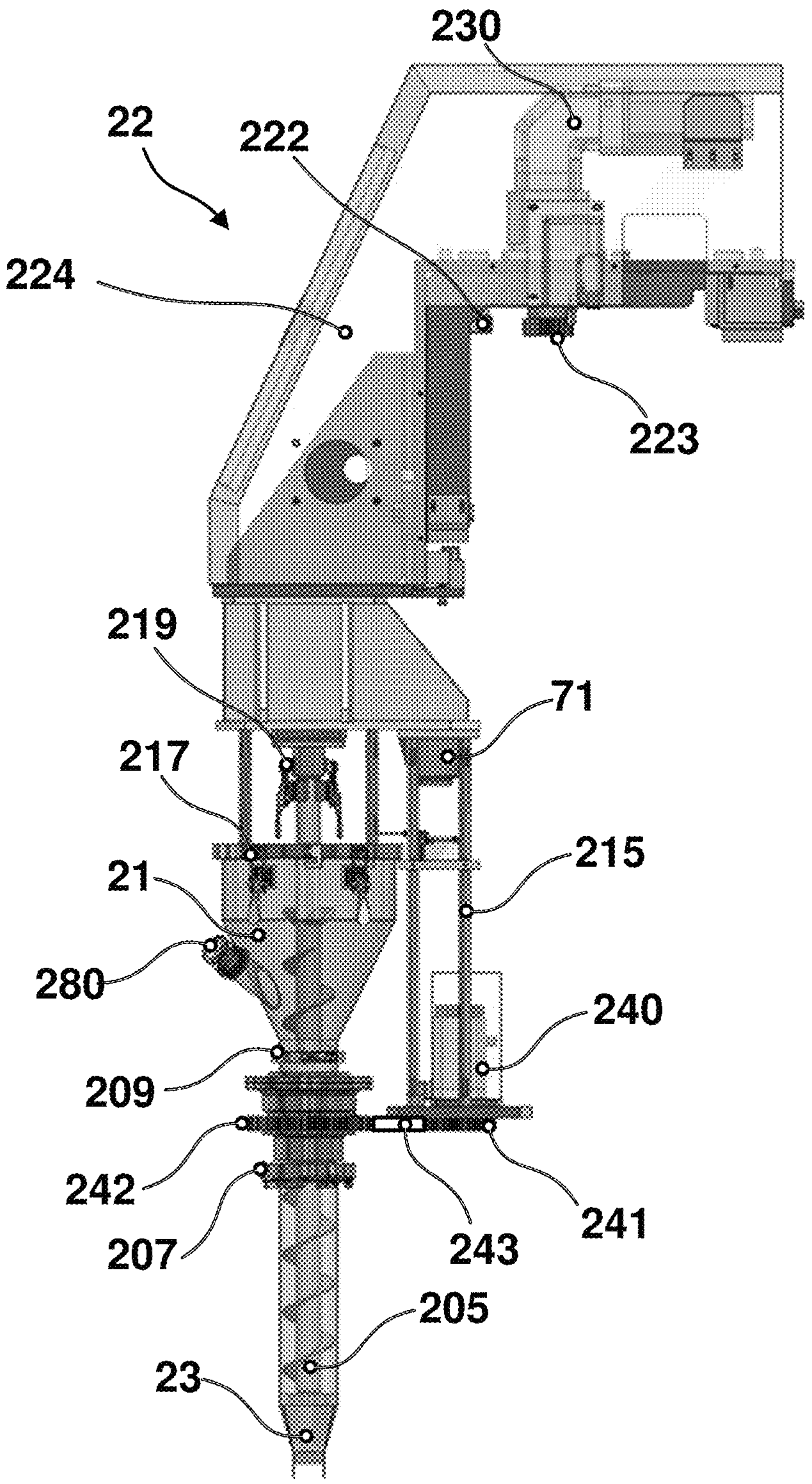
FIG. 5 illustrates an exemplary profile view of an embodiment of an exemplary nozzle, X-axis displacement mechanism, and other operational features of the nozzle configured for use in an exemplary gantry-based additive manufacturing system.
Figure 5A:
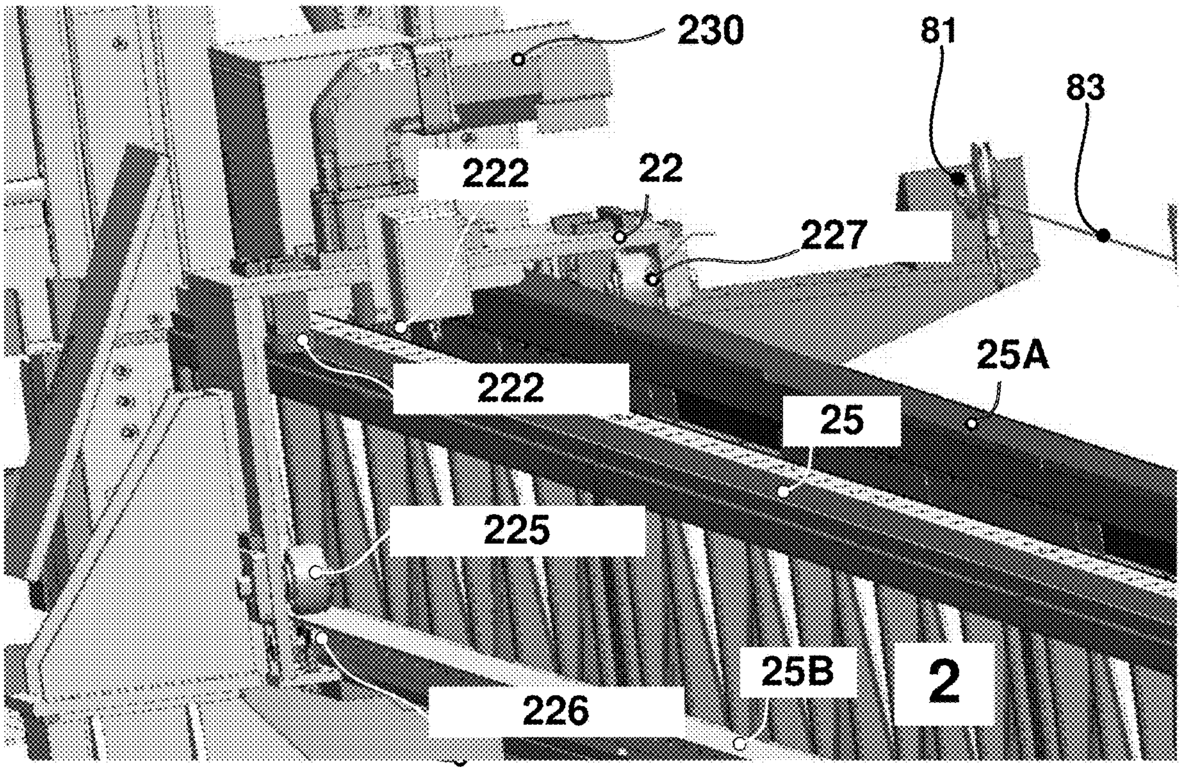
FIG. 5A illustrates an exemplary perspective view of an embodiment of an exemplary nozzle, X-axis displacement mechanism, and other operational features of the nozzle configured for use in an exemplary gantry-based additive manufacturing system.
Figure 5B:
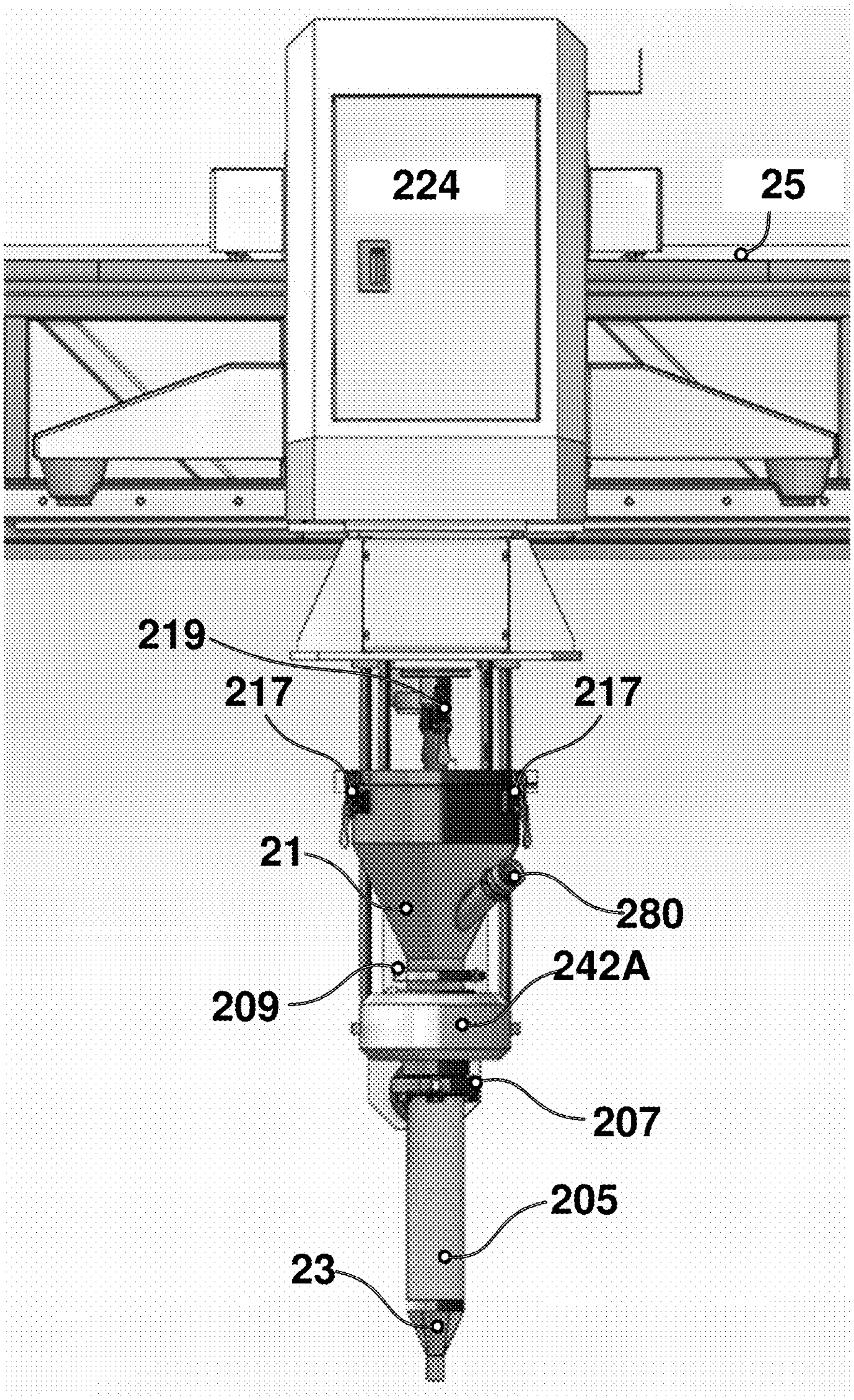
FIG. 5B illustrates an exemplary front plan view of an embodiment of an exemplary nozzle, X-axis displacement mechanism, and other operational features of the nozzle configured for use in an exemplary gantry-based additive manufacturing system.
Figure 5C:
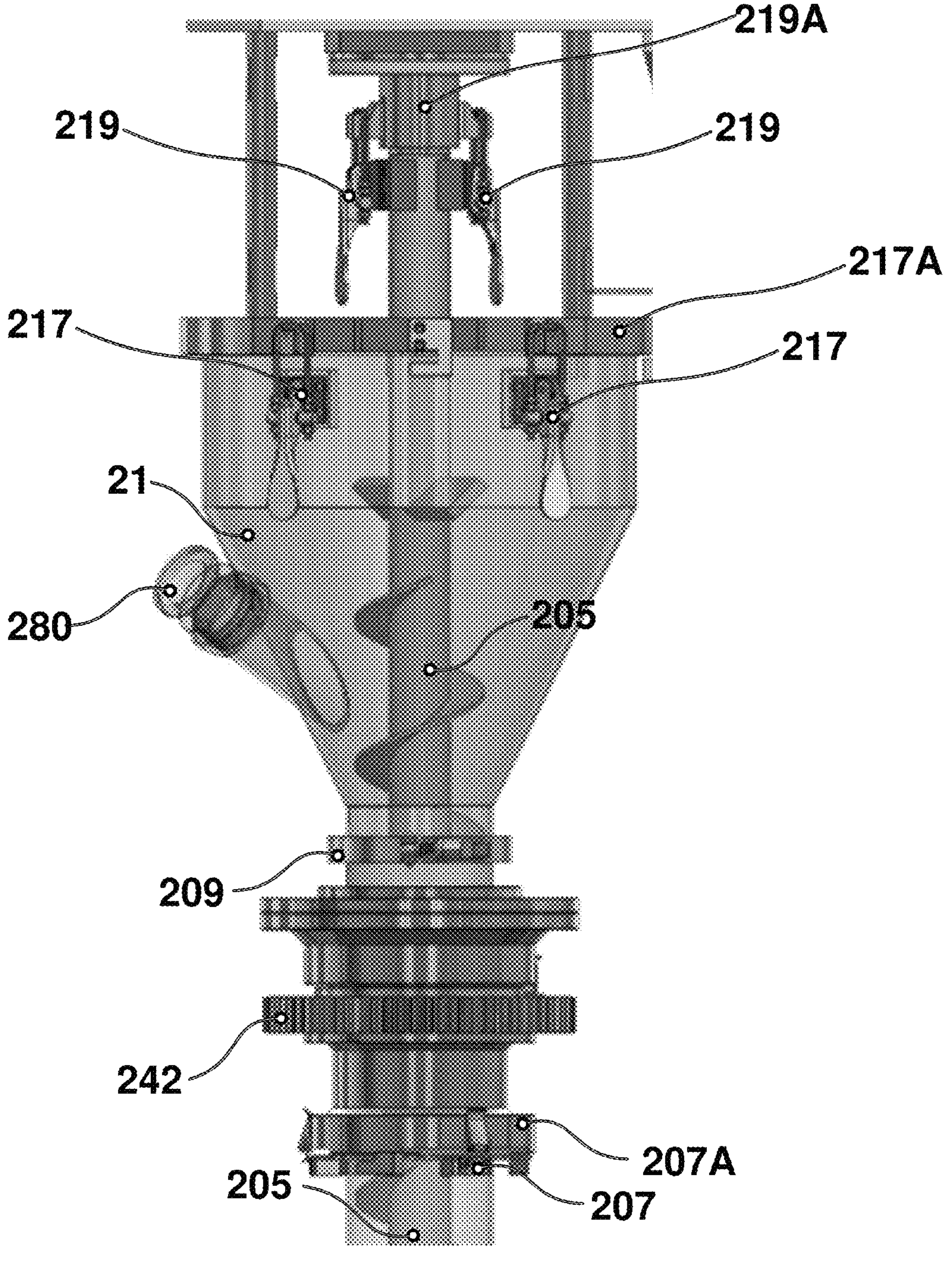
FIG. 5C illustrates an exemplary view of an embodiment of a modular attachment/detachment components of an exemplary nozzle.

As further illustrated in FIGS. 5A-B, an exemplary printing system 22 may be illustrated with a main housing 224 in which the X-axis motive elements are housed to travel about track 25 on the X-axis, and a gear housing 242A located below hopper 21 and above nozzle clamp receiving portion 207A, in which gear 242 may be housed. The exemplary printing system 22 may translate about the X-axis using a combination of driven and idling wheels. As previously described, idler wheels 222 may be adjacent front driving wheel(s) 225 and rear driving wheel(s) 227, which are in rolling contact with tracks 25B and 25A, respectively. While wheels 225 and 227 may be shown as a unitary wheel, an exemplary printing system 22 may be comprised of one or more driven wheels 225 and 227, rack and pinion connections, drive chain mechanisms, magnetized slide-and-shaft connection, actuators, or combinations of the same. As illustrated, the printing system 22 may have a portion that traverses the thickness of the X-axis gantry 2 so as to form a "C"-type structure about the gantry 2 to enable it to be operationally connected and controllable on multiple tracks.

It should be understood that an exemplary system according to the disclosures herein may be comprised in different forms and combinations, and that each of the illustrative embodiments provided and described are for purposes of illustration only and do not otherwise limit the scope of the disclosures and inventive carrying methodologies resulting from the same. Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A gantry-based additive manufacturing system, comprising:
- a first beam along an X-axis;
- a second beam along a Z-axis;
- a third beam along a Y-axis, wherein
  - the first beam and the second beam are coupled so as to translate with respect to one another, and
  - the second beam and the third beam are coupled to one another via a combination of a sliding structure configured to translate along the third beam and a rotatable piston configured to rotate with respect to the second beam and the third beam; and
- a computer-controlled printing system coupled to the first beam, wherein the printing system comprises at least one nozzle configured to eject a material configured to build habitation structures.

2. The gantry-based additive manufacturing system of claim 1, further comprising at least one camera or sensor on one of the first beam, the second beam, or the third beam to provide feedback of activity at the at least one nozzle.

3. The gantry-based additive manufacturing system of claim 2, wherein the at least one camera or sensor is on the printing system.

4. The gantry-based additive manufacturing system of claim 2, wherein the at least one camera or sensor is on the second beam.

5. The gantry-based additive manufacturing system of claim 2, wherein at least three cameras, sensors, or combinations thereof are located on the printing system, one of which is coupled to the at least one nozzle.

6. The gantry-based additive manufacturing system of claim 1, wherein the second beam can be controllably positioned at an angle less than 90-degrees with respect to the third beam.

7. The gantry-based additive manufacturing system of claim 6, wherein the second beam is configured to be parallel to the third beam.

8. The gantry-based additive manufacturing system of claim 1, further comprising a computer-controlled batching station interconnected to the printing system.

9. The gantry-based additive manufacturing system of claim 8, further comprising at least one camera or sensor on one of the first beam, the second beam, the third beam, or the batching station.

10. The gantry-based additive manufacturing system of claim 9, wherein the at least one camera or sensor includes a first camera or sensor on one of the first beam, the second beam, or the third beam, and a second camera or sensor on the batching station, wherein activity of the nozzle recorded by the first camera or sensor is controlled by activity at the batching station.

11. The gantry-based additive manufacturing system of claim 9, wherein the at least one camera or sensor includes a first camera or sensor on one of the first beam, the second beam, or the third beam, and a second camera or sensor on the batching station, wherein activity at the batching station is controlled by activity at the nozzle that is recorded by the first camera or sensor.

12. The gantry-based additive manufacturing system of claim 1, wherein the computer-controlled printing system further comprises at least one nozzle proximate to at least one mister.

13. The gantry-based additive manufacturing system of claim 12, further comprising at least one camera or sensor on one of the first beam, the second beam, the third beam, or the at least one mister to provide feedback of activity at the at least one nozzle.

14. The gantry-based additive manufacturing system of claim 13, wherein the activity of the mister is controlled by activity at the nozzle that is recorded by the at least one camera or sensor.

15. The gantry-based additive manufacturing system of claim 14, further comprising a computer-controlled batching station interconnected to the printing system with at least one second camera or sensor disposed thereon, wherein the activity of the mister is controlled by activity at the nozzle that is recorded by the at least one camera or sensor and activity at the batching station that is recorded by the at least one second camera or sensor.

16. A gantry-based additive manufacturing system, comprising:

a first beam along an X-axis;

a second beam along a Z-axis, wherein the first beam translates along the second beam;

a third beam along a Y-axis, wherein the second beam translates along the third beam;

a computer-controlled printing system coupled to the first beam, wherein the printing system comprises at least one nozzle configured to eject a material configured to build habitation structures;

a computer-controlled batching station for providing the material to the printing system;

at least one sensor or camera for recording activity at the at least one nozzle;

at least one sensor or camera for recording activity at the batching station; and an artificially intelligent control module that sends instructions to one of the printing system and the batching station based on the recorded activity from the at least one sensor or camera at the at least one nozzle and the batching station.

17. The gantry-based additive manufacturing system of claim 16, wherein the artificially intelligent control module instructs one or more of a mix for the material to be ejected at the batching station, an X-axis, Z-axis, or Y-axis location of the at least one nozzle of the printing system, and a speed of ejecting the material.

18. The gantry-based additive manufacturing system of claim 16, wherein the third beam and the second beam can rotate with respect to one another.

19. The gantry-based additive manufacturing system of claim 16, further comprising at least one mister coupled to the first beam.

20. The gantry-based additive manufacturing system of claim 16, further comprising at least one conduit interconnecting the batching station to the printing system, the at least one conduit operatively disposed about the X-axis.

* * * * *